US011916399B2

(12) United States Patent
Pei et al.

(10) Patent No.: US 11,916,399 B2
(45) Date of Patent: Feb. 27, 2024

(54) COIL, WIRELESS CHARGING RECEIVING APPARATUS, WIRELESS CHARGING TRANSMISSION APPARATUS, AND SYSTEM

(71) Applicant: HUAWEI TECHNOLOGIES CO., LTD., Guangdong (CN)

(72) Inventors: Changsheng Pei, Dongguan (CN); Yongfa Zhu, Dongguan (CN); Heqian Yang, Dongguan (CN); Jinsen Cai, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 294 days.

(21) Appl. No.: 16/878,178

(22) Filed: May 19, 2020

(65) Prior Publication Data

US 2020/0279686 A1    Sep. 3, 2020

Related U.S. Application Data

(63) Continuation of application No. PCT/CN2018/116329, filed on Nov. 20, 2018.

(30) Foreign Application Priority Data

Nov. 20, 2017 (CN) .......................... 201711161042.3
Dec. 29, 2017 (CN) .......................... 201711483128.8

(51) Int. Cl.
*H02J 50/00* (2016.01)
*H01F 27/28* (2006.01)
(Continued)

(52) U.S. Cl.
CPC ........ *H02J 50/005* (2020.01); *H01F 27/2823* (2013.01); *H01F 27/2871* (2013.01);
(Continued)

(58) Field of Classification Search
CPC ............. H01F 27/2871; H01F 27/2823; H01F 27/292; H01F 27/346; H01F 38/14; H01F 2027/348; H02J 50/12; H02J 50/40
(Continued)

(56) References Cited

U.S. PATENT DOCUMENTS

2005/0134405 A1    6/2005 Ochi et al.
2013/0214890 A1    8/2013 Zabaco
(Continued)

FOREIGN PATENT DOCUMENTS

CN    102222967 A    10/2011
CN    103748764 A    4/2014
(Continued)

OTHER PUBLICATIONS

Jin-Hyoung Kim et al. New Structure for High Q-Factor Printed Antenna in Wireless Power Transmission, IEEE Eurocon 2017, Jul. 6-8, 2017, Ohrid, R. Macedonia. pp. 474-478.

*Primary Examiner* — Daniel Kessie
*Assistant Examiner* — Dru M Parries
(74) *Attorney, Agent, or Firm* — WOMBLE BOND DICKINSON (US) LLP

(57) ABSTRACT

This application describes a coil. The coil includes an output terminal, an input terminal, and a wire-winding part that is connected between the output terminal and the input terminal. A slot is disposed on at least a part of the wire-winding part, and a depth of the slot in any direction of a cross section of the wire-winding part is less than or equal to a distance between two points that are the farthest away from each other on the cross section of the wire-winding part. The wire-winding part is a metal conductor made through spiral winding. The input terminal and the output terminal are configured to connect the wire-winding part to an external circuit.

17 Claims, 22 Drawing Sheets

(51) Int. Cl.
*H02J 50/12* (2016.01)
*H01F 27/29* (2006.01)
*H01F 27/34* (2006.01)
*H01F 38/14* (2006.01)
*H02J 50/40* (2016.01)
*H02J 50/10* (2016.01)
*H02J 50/70* (2016.01)

(52) U.S. Cl.
CPC ......... *H01F 27/292* (2013.01); *H01F 27/346* (2013.01); *H01F 38/14* (2013.01); *H02J 50/10* (2016.02); *H02J 50/12* (2016.02); *H02J 50/402* (2020.01); *H02J 50/70* (2016.02); *H01F 2027/348* (2013.01)

(58) Field of Classification Search
USPC .......................................................... 336/199
See application file for complete search history.

(56) References Cited

U.S. PATENT DOCUMENTS

| | | | |
|---|---|---|---|
| 2015/0145634 A1* | 5/2015 | Kurz | .................... H01F 27/2871 29/606 |
| 2016/0126001 A1 | 5/2016 | Chien et al. | |
| 2017/0278619 A1 | 9/2017 | Lee et al. | |
| 2018/0205264 A1 | 7/2018 | Akuzawa et al. | |
| 2018/0205268 A1* | 7/2018 | Park | ......................... H02J 50/50 |

FOREIGN PATENT DOCUMENTS

| | | |
|---|---|---|
| CN | 204014143 U | 12/2014 |
| CN | 105957701 A | 9/2016 |
| CN | 106898473 A | 6/2017 |
| CN | 107046333 A | 8/2017 |
| CN | 107068357 A | 8/2017 |
| CN | 108321914 A | 7/2018 |
| JP | 2013078234 A | 4/2013 |
| KR | 20170107346 A | 9/2017 |
| TW | 201320121 A | 5/2013 |
| TW | 201616526 A | 5/2016 |

\* cited by examiner

COIL, WIRELESS CHARGING RECEIVING APPARATUS, WIRELESS CHARGING TRANSMISSION APPARATUS, AND SYSTEM

CROSS-REFERENCE TO RELATED APPLICATIONS

This application is a continuation of International Application No. PCT/CN2018/116329, filed on Nov. 20, 2018, which claims priority to Chinese Patent Application No. 201711483128.8, filed on Dec. 29, 2017, Chinese Patent Application No. 201711161042.3, filed on Nov. 20, 2017. All of the aforementioned patent applications are hereby incorporated by reference in their entireties

TECHNICAL FIELD

Embodiments of the present invention relate to the field of wireless charging, and more specifically, to a coil and a wireless charging apparatus and system.

BACKGROUND

As mobile terminals are widely used, there is an increasingly growing need for wireless charging. When all mobile terminals including smartphones support wireless charging in the future, users no longer need to waste time or efforts in searching for chargers, charging USB cables, or sockets. A mobile phone can be charged without a need to be physically connected to any power supply, and there is no need to worry that the mobile phone cannot be powered on because a battery runs out.

However, in a current mobile phone, wireless charging using maximum power cannot be implemented due to heat dissipation, and a charging current is limited. To further improve a charging speed, wireless charging efficiency needs to be improved. During wireless charging, energy is transmitted mainly based on a magnetic coupling principle of a transmission coil and a receiving coil. Therefore, there is a very strong alternating current magnetic field between the transmission coil and the receiving coil. As shown in FIG. 1a, a metal coil is placed in an alternating current magnetic field, and the alternating current magnetic field cuts through a metal conductor and induces an eddy current, leading to an eddy current loss. A magnitude of the eddy current is directly proportional to a size of a metal area. Therefore, a larger area of a coil indicates a larger eddy current loss in the coil in the same magnetic field, and if a transmission coil and a receiving coil have very large eddy current losses, wireless charging efficiency is low. If a coil is merely made thinner, charging efficiency is very low, and even is lower than 50%. This is because an alternating current passes through the coil, a loss in the coil is obtained by multiplying a current by alternating current resistance, and the alternating current resistance includes direct current resistance (in a coil in some approaches, alternating current resistance is approximately 1.5 to 2 times as large as direct current resistance). If the coil is made thinner, the direct current resistance is greatly increased. Consequently, a final alternating current resistance is greatly increased, the loss in the coil is increased, and charging efficiency is reduced. As shown in FIG. 1b, in particular, in a charging status in which a mobile phone does not exactly face a wireless charger, very large eddy current losses are caused in a wireless charging coil of the wireless charger and a wireless charging receiving coil of the mobile phone by a magnetic field in a wireless charging process.

SUMMARY

Embodiments of this application provide a coil structure. A slot is disposed on the coil, so that a loss in the coil in a wireless charging process can be effectively reduced, and wireless charging efficiency can be improved.

Technical solutions according to embodiments discussed herein are as follows:

According to a first aspect, a coil is provided. The coil includes an output terminal, an input terminal, and a wire-winding part that is connected between the output terminal and the input terminal. A slot is disposed on at least a part of the wire-winding part, and a depth of the slot in any direction of a cross section of the wire-winding part is less than or equal to a distance between two points that are the farthest away from each other on the cross section of the wire-winding part, to reduce an eddy current loss caused in the coil by a magnetic field. The wire-winding part is a metal conductor made through spiral winding. The input terminal and the output terminal are configured to connect the wire-winding part to an external circuit.

When the coil in this application is applied to a wireless charging scenario, under the action of an alternating current magnetic field, the slot is disposed on the coil, so that a closed-loop path generated by an eddy current that is generated by the alternating current magnetic field in a wire-winding metal conductor of the coil is cut off, and resistance caused by the eddy current in the winding of the coil is greatly reduced. In addition, a decrease amplitude of the resistance caused by the eddy current is greater than an increase amplitude of direct current resistance in the wire-winding metal conductor of the coil, so that alternating current resistance in the winding of the coil in the wireless charging scenario is reduced on the whole.

In embodiments of this application, a ratio of the alternating current resistance to the direct current resistance in the coil is approximately 1.3, so that a percentage of the resistance generated by the eddy current in the coil is greatly reduced, a loss in the coil is reduced, and charging efficiency is improved. In particular, in a charging status in which a mobile phone does not exactly face a wireless charger, the slot is disposed to partially cut off an eddy current path generated by magnetic lines in the alternating current magnetic field in the winding of the coil, where an angle between a plane of the coil and the magnetic lines is relatively large. This can greatly reduce an eddy current loss generated by the wireless charging magnetic field in the winding of the coil.

Optionally, the slot extends in a winding length direction of the wire-winding part, and a length of the slot is equal to a length of the wire-winding part; or the slot is disposed in segments in a winding length direction of the wire-winding part, and a length of the slot is less than a length of the wire-winding part.

Optionally, a width of at least one turn of winding of the wire-winding part is not equal to a width of other winding.

Optionally, a width of the wire-winding part increases as a winding radius increases, so that a width of an inner ring of the wire-winding part is less than a width of an outer ring. The width of the wire-winding part increases as the winding radius increases on the whole, but it is not excluded that there is an exceptional case for a particular turn of the coil.

Optionally, when the slot cuts through the wire-winding part in any direction of the cross section of the wire-winding part, the slot enables at least a part of the wire-winding part to form at least two conductive paths that are connected in parallel, and a parallel connection point of the at least two conductive paths that are connected in parallel is disposed on an uncut part of the wire-winding part, or is disposed on the input terminal and the output terminal, or is directly disposed on a connection terminal of the external circuit.

Optionally, when the coil is a two-layer coil, the slot is disposed on at least one layer of the coil.

Optionally, when the coil is a two-layer coil, the wire-winding part of the coil includes a first-layer wire-winding part and a second-layer wire-winding part, and the input terminal or the output terminal is located at a first layer of the coil or a second layer of the coil;

the output terminal includes a first part of the output terminal and a second part of the output terminal;

one end of the first part of the output terminal is connected to an innermost-turn coil of the first-layer wire-winding part, and the first part of the output terminal and the first-layer wire-winding part are located on a same plane; and the second part of the output terminal and the second-layer wire-winding part are located on a same plane, one end of the second part of the output terminal is used as an output end of the coil and is connected to the external circuit, and the other end of the second part of the output terminal and the other end of the first part of the output terminal are connected in series via a through hole disposed between the first-layer wire-winding part and the second-layer wire-winding part.

Optionally, one end of the input terminal is connected to an outermost turn of the first-layer wire-winding part or the second-layer wire-winding part, and the other end is connected to the external circuit.

Optionally, the first-layer wire-winding part and the second-layer wire-winding part are separately cut off at the input terminal or the output terminal, and the first-layer wire-winding part and the second-layer wire-winding part are connected in parallel via the through hole.

Optionally, there are one or more slots, and a projection shape of the slot on a plane of the coil includes one or more of a strip shape, a hole shape, an arc shape, a wavy shape, and a comb shape. A shape of the slot is not limited to the foregoing listed shapes.

Optionally, a projection shape of the wire-winding part on the plane of the coil is a ring shape, an elliptical ring shape, or an irregular ring shape. A shape of the coil is not limited to the foregoing listed shapes.

According to a second aspect, a wireless charging receiving apparatus of a mobile terminal is provided, includes a matching circuit, an AC/DC conversion module, and a control unit, and further includes the coil in the first aspect and various optional implementations of the first aspect.

The matching circuit is connected between the coil and the AC/DC conversion module, and is configured to generate resonance with the coil, so that alternating current energy received by a receiving coil is efficiently transmitted to a to-be-charged device.

The control unit is configured to control the AC/DC conversion module to convert an alternating current signal received by the coil into a direct current signal, to supply power to a load in the mobile terminal.

In embodiments of this application, the coil is applied to a wireless charging scenario, and for the receiving coil in the wireless charging receiving apparatus, for example, a mobile phone, a slot is disposed on the receiving coil in the wireless charging receiving apparatus, for example, the mobile phone, so that an induced current generated in the receiving coil under the action of an alternating current magnetic field is the same as a current generated in the receiving coil when the receiving coil is not cut through, in other words, energy received by the receiving coil is the same as energy received when the receiving coil is not cut through, but alternating current resistance in the receiving coil is reduced, reducing an energy loss in the receiving coil.

Optionally, the wireless charging receiving apparatus of the mobile terminal further includes a magnetic conductive sheet, and the magnetic conductive sheet is disposed on a side, away from a transmission apparatus, of a plane of the coil, and is configured to prevent leakage of a magnetic field generated by the wire-winding part. The transmission apparatus is configured to charge the wireless charging receiving apparatus of the mobile terminal.

Optionally, there are one or more coils.

According to a third aspect, a wireless charging transmission apparatus of a mobile terminal is provided, and includes a direct current power supply, a DC/AC conversion module, a matching circuit, a transmission coil, and a control unit. The transmission coil is the coil in the first aspect and various optional implementations of the first aspect.

the control unit is configured to control the DC/AC conversion module to convert a signal of the direct current power supply into an alternating current signal, and control the alternating current signal to pass through the matching circuit and the transmission coil, so that the transmission coil transmits alternating current energy.

In the solution of this application, the slot is disposed on the transmission coil of the wireless charging transmission apparatus, and a wire-winding part of the transmission coil is cut or partially cut, so that when the wireless charging transmission apparatus works in a wireless charging alternating current magnetic field, under the action of the wireless charging alternating current magnetic field, alternating current resistance in the transmission coil is reduced, reducing an energy loss in the transmission coil.

According to a fourth aspect, a wireless charging system of a mobile terminal is provided, and includes the wireless charging receiving apparatus of the mobile terminal in the second aspect and various optional implementations of the second aspect and the wireless charging transmission apparatus of the mobile terminal in the third aspect. The wireless charging transmission apparatus of the mobile terminal is configured to charge the wireless charging receiving apparatus of the mobile terminal.

Specifically, in embodiments of this application, the slot is disposed on the receiving coil, so that thickness of the receiving coil is reduced or a cross-sectional area is reduced, and the direct current resistance in the coil is increased to some extent. However, in the wireless charging scenario, approximately at least 30% of the alternating current resistance in the coil is not caused by the direct current resistance in the coil, and this part of resistance is actually an equivalent resistance, namely, an eddy current resistance, that is lost because a current is generated in a metal conductor of the coil when a magnetic field generated in a wireless charging process cuts through the metal conductor. When the metal conductor of the coil is cut through by the wireless charging magnetic field, an eddy current closed-loop path is generated in the metal conductor of the coil, and this part of eddy current cannot form an effective output current in the coil, and increases an energy loss in the coil. The coil is cut or partially cut, so that the eddy current closed-loop path that is generated when the metal conductor of the coil is cut through by the wireless charging magnetic field can be cut off, reducing an eddy current loss in the receiving coil. In addition, in this application, the coil is cut, so that a decrease amplitude of the energy loss generated by the eddy current in the receiving coil is greater than a loss caused by an increase in the direct current resistance in the coil, reducing a loss of the alternating current resistance in the coil on the whole.

In short, the slot is disposed on the receiving coil, so that the closed-loop path generated by the eddy current in the metal conductor of the coil is cut off, and resistance caused by the eddy current in the receiving coil is greatly reduced. In addition, a decrease amplitude of the resistance caused by the eddy current is greater than an increase amplitude of the direct current resistance, so that the alternating current resistance in the coil in the wireless charging scenario is reduced on the whole. In embodiments of this application, the ratio of the alternating current resistance to the direct current resistance in the coil is approximately 1.3, so that the percentage of the resistance generated by the eddy current in the coil is greatly reduced, the loss in the coil is reduced, and charging efficiency is improved. In particular, in a charging status in which the mobile phone does not exactly face the wireless charger, the eddy current path generated by the magnetic lines in the coil in the wireless charging process is cut off, where the angle between the plane of the coil and the magnetic lines is relatively large, so that the eddy current loss generated by the wireless charging magnetic field in the coil can be greatly reduced.

DESCRIPTION OF EMBODIMENTS

The following clearly describes the technical solutions in the embodiments of the present invention with reference to the accompanying drawings in the embodiments of the present invention.

It should be understood that the embodiments of the present invention may be applied to various charging scenarios, and a mobile terminal is not limited to a smartphone, a tablet computer, or a wearable device, and is not limited to various mobile terminal devices such as an electric automobile. This is not limited in the embodiments of the present invention.

Figure 1A:
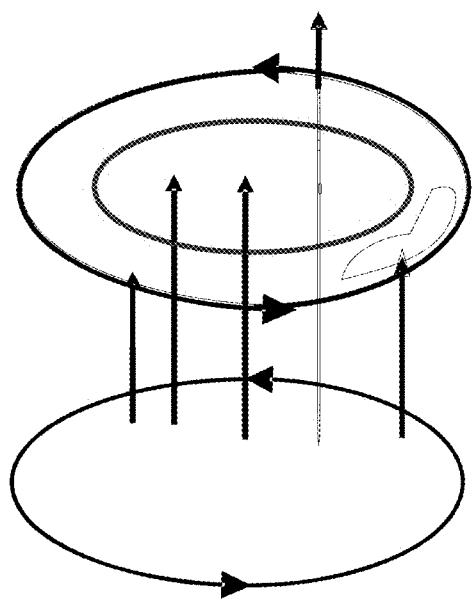
FIG. 1a is a schematic diagram of a magnetic circuit of a wireless charging system of a mobile terminal.
Figure 1B:
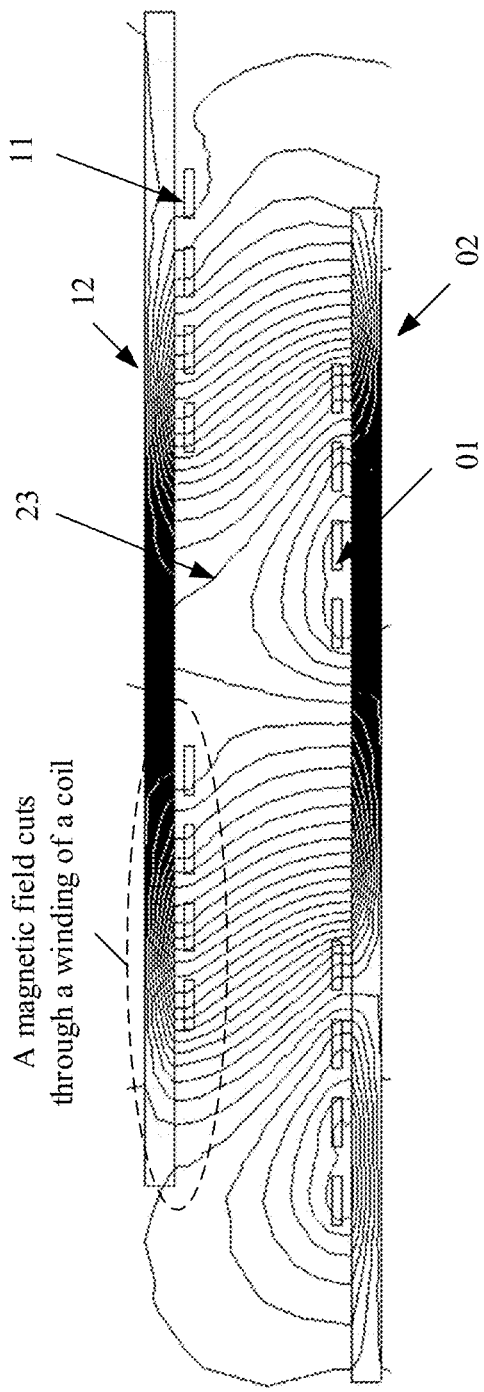
FIG. 1b is a schematic diagram of a magnetic circuit of a wireless charging system of a mobile terminal.
Figure 2:
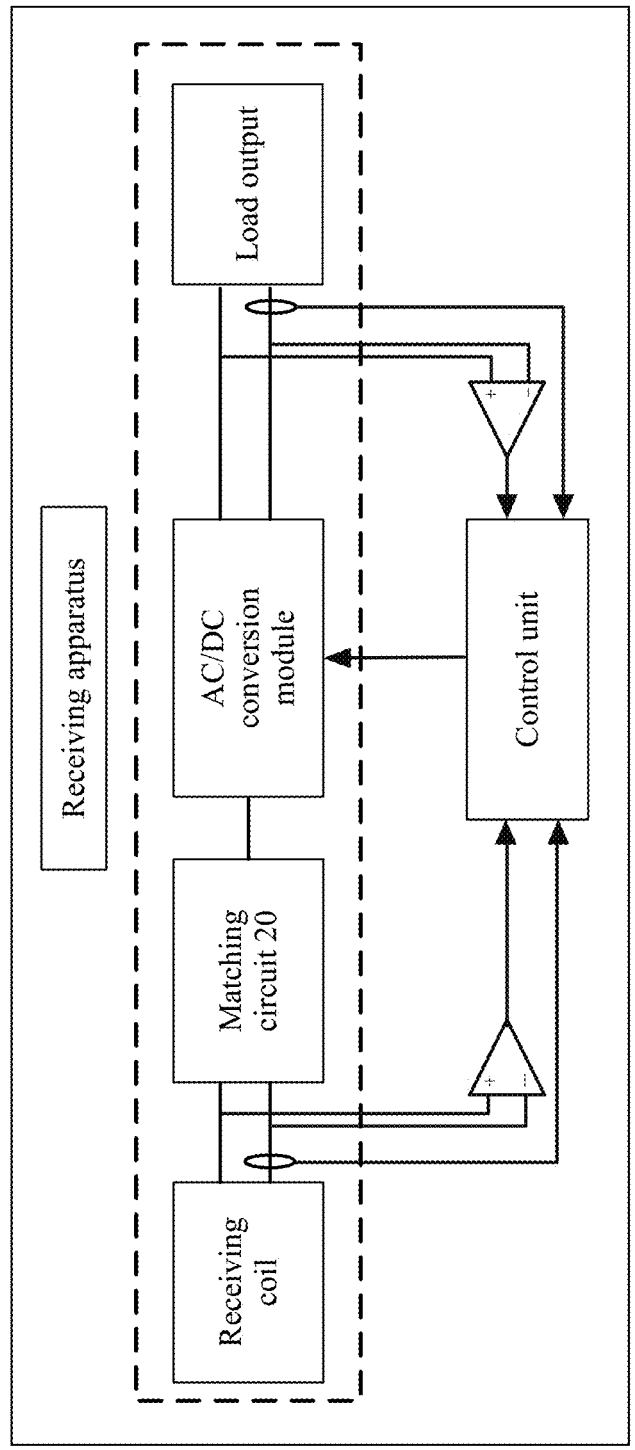
FIG. 2 is a schematic diagram of a wireless charging receiving apparatus of a mobile terminal according to an embodiment of this application.

FIG. 2 shows a wireless charging receiving apparatus of a mobile terminal in some embodiments of the present invention. The wireless charging receiving apparatus of the mobile terminal is disposed inside the mobile terminal, for example, inside a mobile phone. The wireless charging receiving apparatus of the mobile terminal is configured to receive energy transmitted by a wireless charging transmission apparatus, and the wireless charging transmission apparatus is a wireless charger or the like, and is configured to charge the mobile terminal. The wireless charging receiving apparatus of the mobile terminal includes a wireless charging receiving coil, a matching circuit 20, an AC/DC conversion module, a control unit, and a load output. The wireless charging receiving coil is at least one of coils shown in FIG. 3a, FIG. 3b, and FIG. 4 to FIG. 13. For example, the coil is the coil shown in FIG. 3a. The coil includes an output terminal 304, an input terminal 303, and a wire-winding part 302 that is connected between the output terminal 304 and the input terminal 303. A slot 305 is disposed on at least a part of the wire-winding part 302, and a depth of the slot 305 in any direction of a cross section of the wire-winding part is less than or equal to a distance between two points that are the farthest away from each other on the cross section of the wire-winding part, to reduce an eddy current loss caused in the coil by a magnetic field. The wire-winding part 302 is a metal conductor made through spiral winding. The input terminal 303 and the output terminal 304 are configured to connect the wire-winding part 302 to an external circuit. The wire-winding part 302 is configured to cut through the magnetic field in a wireless charging scenario, to generate an induced current. The wire-winding part 302 is a metal conductor made through spiral winding. The input terminal 303 and the output terminal 304 are configured to connect the wire-winding part to the external circuit, to supply the induced current to a load of the external circuit for use. When the wireless charging receiving apparatus of the mobile terminal receives the energy transmitted by the wireless charging transmission apparatus, the wireless charging receiving coil is configured to receive an alternating current signal transmitted by a transmission coil of the wireless charging transmission apparatus. The alternating current signal is transmitted to the AC/DC conversion module by using the receiving coil and the matching circuit 20. The AC/DC conversion module converts the received alternating current signal into a direct current signal, to charge load in the mobile terminal. The control unit of the wireless charging receiving apparatus of the mobile terminal controls working of the wireless charging receiving coil, the matching circuit 20, and the AC/DC conversion module.

Figure 3A:
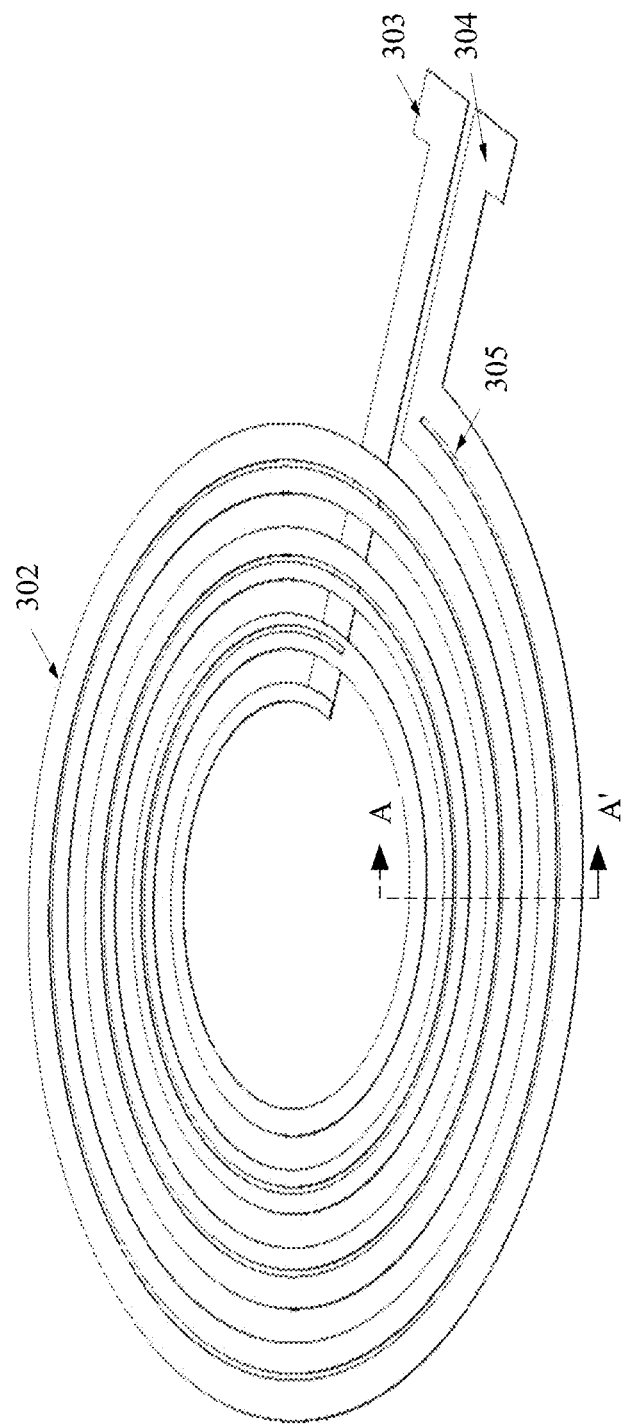
FIG. 3a is a schematic diagram of a coil according to another embodiment of this application.
Figure 3B:
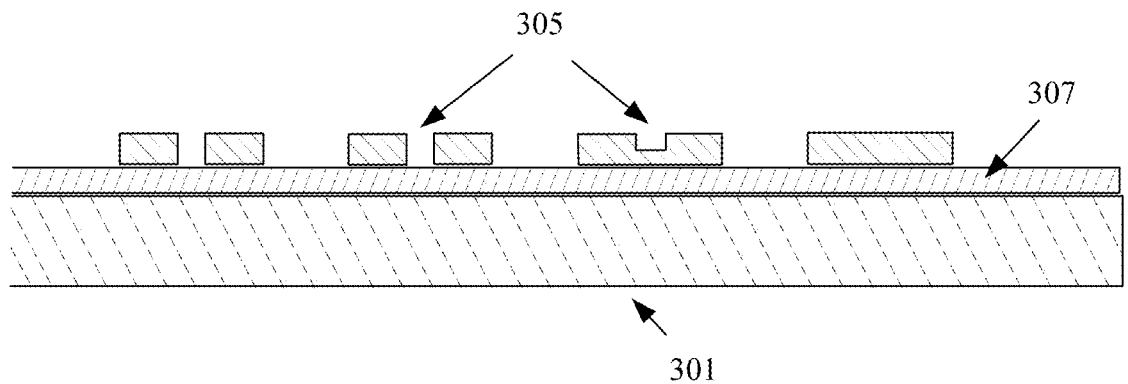
FIG. 3b is a schematic structural diagram of a cross section of a coil according to another embodiment of the present invention.
Figure 3C:
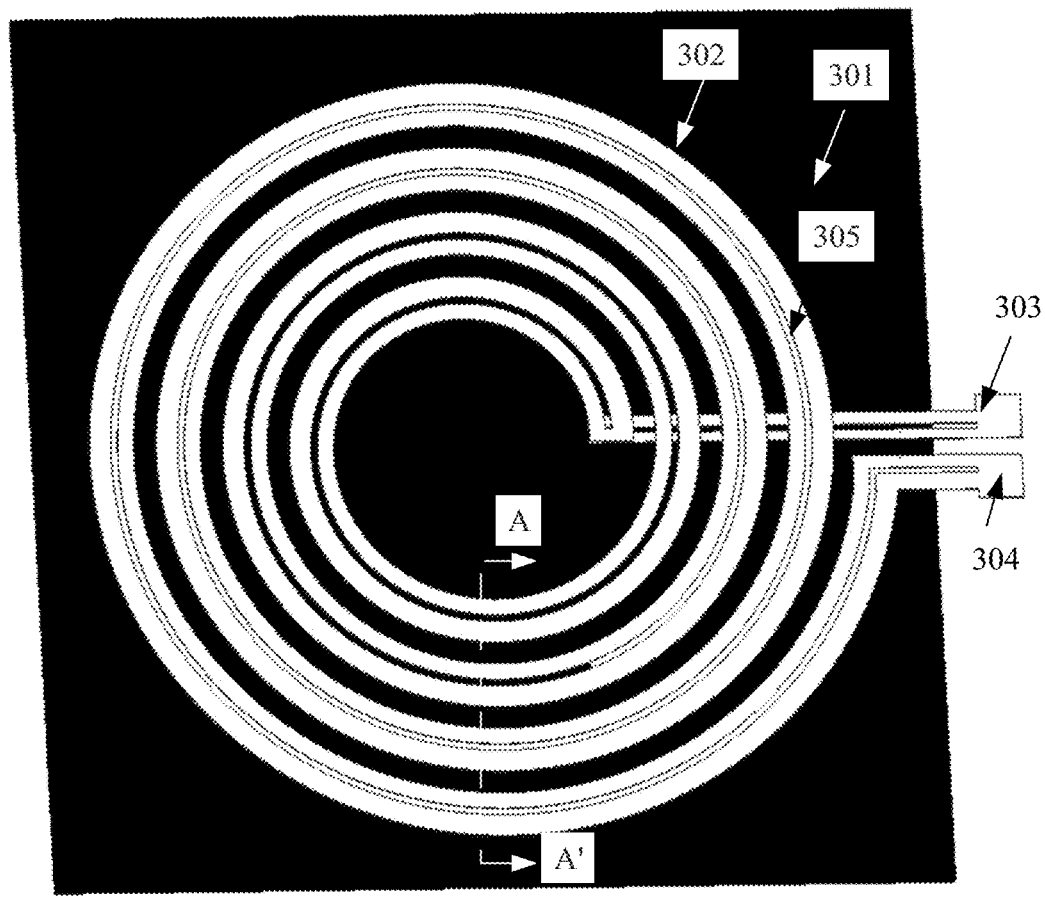
FIG. 3c is a schematic diagram of a coil and a magnetic conductive sheet according to another embodiment of this application.
Figure 3D:
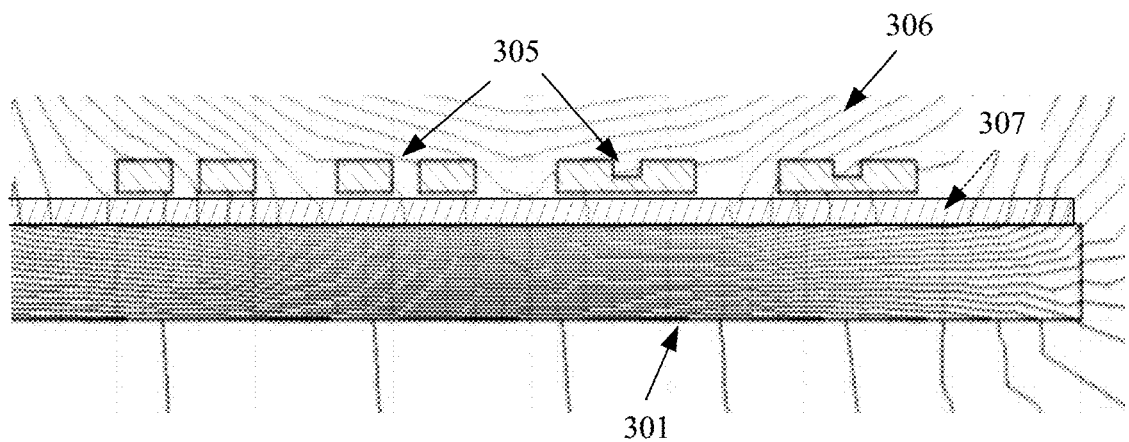
FIG. 3d is a schematic structural diagram of cross sections of a coil and a magnetic conductive sheet according to another embodiment of this application.

Further, as shown in FIG. 3c, the wireless charging receiving apparatus further includes a magnetic conductive sheet 301, the magnetic conductive sheet is disposed on a side, away from the transmission apparatus, of a plane of the coil, and is configured to prevent leakage of a magnetic field generated by the wire-winding part. The transmission apparatus is configured to charge the wireless charging receiving apparatus of the mobile terminal. The magnetic conductive sheet 301 plays a magnetic conductive role, so that an inductance value of the wire-winding part 302 can be increased. In addition, the magnetic field is prevented from leaking to space below the magnetic conductive sheet, to better shield a component below the magnetic conductive sheet. The magnetic conductive sheet 301 may be made of a magnetic material such as ferrite or amorphous-nanocrystalline. FIG. 3d is a schematic structural diagram of cross sections of the coil and the magnetic conductive sheet that are shown in FIG. 3c.

In this application, the coil is applied to the wireless charging scenario, and for the receiving coil in the wireless charging receiving apparatus, for example, a mobile phone, the slot is disposed on a part of the receiving coil in the wireless charging receiving apparatus, for example, the mobile phone, so that an induced current generated in the receiving coil under the action of an alternating current magnetic field is the same as a current generated in the receiving coil when the receiving coil is not cut through, in other words, energy received by the receiving coil is the same as energy received when the receiving coil is not cut through, but alternating current resistance in the receiving coil is reduced, reducing an energy loss in the receiving coil.

FIG. 3a is a schematic diagram of a coil according to an embodiment of this application. The coil includes an output terminal 304, an input terminal 303, and a wire-winding part 302 that is connected between the output terminal 304 and the input terminal 303. A slot 305 is disposed on at least a part of the wire-winding part 302, and a depth of the slot 305 in any direction of a cross section of the wire-winding part is less than or equal to a distance between two points that are the farthest away from each other on the cross section of the wire-winding part, to reduce an eddy current loss caused in the coil by a magnetic field. The wire-winding part 302 is a metal conductor made through spiral winding. The input terminal 303 and the output terminal 304 are configured to connect the wire-winding part 302 to an external circuit.

When the coil in this application is applied to a wireless charging scenario, under the action of an alternating current magnetic field, the slot is disposed on the coil, so that a closed-loop path generated by an eddy current that is generated by the alternating current magnetic field in a wire-winding metal conductor of the coil is cut off, and resistance caused by the eddy current in the winding of the coil is greatly reduced. In addition, a decrease amplitude of the resistance caused by the eddy current is greater than an increase amplitude of direct current resistance in the wire-winding metal conductor of the coil, so that alternating current resistance in the winding of the coil in the wireless charging scenario is reduced on the whole.

In this application, a ratio of the alternating current resistance to the direct current resistance in the coil is approximately 1.3, so that a percentage of the resistance generated by the eddy current in the coil is greatly reduced, a loss in the coil is reduced, and charging efficiency is improved. In particular, in a charging status in which a mobile phone does not exactly face a wireless charger, the slot is disposed to partially cut off an eddy current path generated by magnetic lines in the alternating current magnetic field in the winding of the coil, where an angle between a plane of the coil and the magnetic lines is relatively large. This can greatly reduce an eddy current loss generated by the wireless charging magnetic field in the winding of the coil.

Further, the slot extends in a winding length direction of the wire-winding part, and a length of the slot is equal to a length of the wire-winding part; or the slot is disposed in segments in a winding length direction of the wire-winding part, and a length of the slot is less than a length of the wire-winding part.

Further, a width of at least one turn of winding of the wire-winding part is not equal to a width of other winding (s).

Further, a width of the wire-winding part increases as a winding radius increases, so that a width of an inner ring of the wire-winding part is less than a width of an outer ring. The width of the wire-winding part increases as the winding radius increases on the whole, but it is not excluded that there is an exceptional case for a particular turn of the coil.

Optionally, when the slot cuts through the wire-winding part in any direction of the cross section of the wire-winding part, the slot enables at least a part of the wire-winding part to form at least two conductive paths that are connected in parallel, and a parallel connection point of the at least two conductive paths that are connected in parallel is disposed on an uncut part of the wire-winding part, or is disposed on the input terminal and the output terminal, or is directly disposed on a connection terminal of the external circuit.

Further, when the coil is a two-layer coil, the slot is disposed on at least one layer of the coil.

Further, when the coil is a two-layer coil, the wire-winding part of the coil includes a first-layer wire-winding part and a second-layer wire-winding part, and the input terminal or the output terminal is located at a first layer of the coil or a second layer of the coil.

The output terminal includes a first part of the output terminal and a second part of the output terminal.

One end of the first part of the output terminal is connected to an innermost-turn coil of the first-layer wire-winding part, and the first part of the output terminal and the first-layer wire-winding part are located on a same plane.

The second part of the output terminal and the second-layer wire-winding part are located on a same plane, one end of the second part of the output terminal is used as an output end of the coil and is connected to the external circuit, and the other end of the second part of the output terminal and the other end of the first part of the output terminal are connected in series via a through hole disposed between the first-layer wire-winding part and the second-layer wire-winding part.

Further, one end of the input terminal is connected to an outermost turn of the first-layer wire-winding part or the second-layer wire-winding part, and the other end is connected to the external circuit.

Further, the first-layer wire-winding part and the second-layer wire-winding part are separately cut off at the input terminal or the output terminal, and the first-layer wire-winding part and the second-layer wire-winding part are connected in parallel via the through hole.

Further, there are one or more slots, and a projection shape of the slot on a plane of the coil includes one or more of a strip shape, a hole shape, an arc shape, a wavy shape, and a comb shape. A shape of the slot is not limited to the foregoing listed shapes.

Further, a projection shape of the wire-winding part on the plane of the coil is a ring shape, an elliptical ring shape, or an irregular ring shape. A shape of the coil is not limited to the foregoing listed shapes.

Further, as shown in FIG. 3c, the wireless charging receiving apparatus further includes a magnetic conductive sheet 301, the magnetic conductive sheet is disposed on a side, away from a transmission apparatus, of the plane of the coil, and is configured to prevent leakage of a magnetic field generated by the wire-winding part. The transmission apparatus is configured to charge the wireless charging receiving apparatus of the mobile terminal. The magnetic conductive sheet 301 plays a magnetic conductive role, so that an inductance value of the wire-winding part 302 can be increased. In addition, the magnetic field is prevented from leaking to space below the magnetic conductive sheet, to better shield a component below the magnetic conductive sheet. The magnetic conductive sheet 301 may be made of a magnetic material such as ferrite or amorphous-nanocrystalline.

In the solution of this application, the slot is disposed on the coil, so that the direct current resistance in the coil is increased to some extent, and the alternating current resistance in the coil is also increased. However, in the wireless charging scenario, approximately 50% to 100% of the alternating current resistance in the coil is not caused by the direct current resistance in the coil, and this part of resistance is actually caused by cutting through the magnetic field in the wireless charging scenario by the metal conductor of the coil. The coil of the wireless charging coil is cut or partially cut in the winding length direction, and an eddy current that is generated in the metal conductor of the wire-winding part 302 of the coil because the coil cuts through the magnetic field in the wireless charging scenario can be cut off, so that a final alternating current resistance in the coil is reduced. In short, the coil is cut, so that resistance caused by the eddy current that is generated by the alternating current magnetic field in the coil is greatly reduced, and finally, the alternating current resistance is greatly reduced. In this application, a ratio of the alternating current resistance to the direct current resistance is approximately 1.3 after optimization, greatly reducing a percentage of an eddy current resistance.

In conclusion, the slot is disposed on the coil in the wireless charging receiving apparatus, so that an eddy current closed loop generated by the wireless charging magnetic field in the coil is cut off, and the eddy current resistance is reduced. In addition, the decrease amplitude of the eddy current resistance is greater than the increase amplitude of the direct current resistance in the coil, so that the alternating current resistance in the coil in the wireless charging receiving apparatus is reduced, an energy loss in the charging process is reduced, and charging efficiency is improved.

Further, a total length of all slots on the wireless charging receiving coil having the slot accounts for at least 10% of a length of this turn of the wire-winding part. Further, a ratio of a width of the slot to a width of the wire-winding part 302 is less than or equal to 70%.

FIG. 3b is a sectional view of the coil in FIG. 3a in an AA' direction. FIG. 3d is a schematic structural diagram of a cross section of the coil and shows a distribution status of magnetic fields near the coil in the solution of this application in a wireless charging process. Lines shown by 306 are alternating current magnetic lines generated by an alternating current in the wireless charging process. When the alternating current magnetic lines 306 pass through the wire-winding part 302, an induced voltage $V_{ac}$ may be induced, and the induced voltage $V_{ac}$ is directly proportional to the width of the wire-winding part 302. A larger width of wire-winding part 302 leads to a larger induced voltage $V_{ac}$. Because the wire-winding part 302 is a conductor, the induced voltage $V_{ac}$ generates an induced current $I_{ac}$ in the wire-winding part 302, the induced current $I_{ac}$ causes a loss in the wire-winding part 302, and the loss is directly proportional to the square of the induced voltage $V_{ac}$ or the square of the induced current $I_{ac}$. In a prior-art solution, the wire-winding part 302 is relatively wide, and consequently an eddy current loss is very large. In the solution of the present invention, the slot 305 is disposed on the coil in the wireless charging receiving apparatus, and two cases are specifically included. In one case, the slot 305 cuts through the coil. In the other case, the slot 305 having a preset depth is disposed on the coil, but the slot does not cut through the coil. Therefore, the eddy current loss in the wire-winding part 302 can be greatly reduced, and wireless charging efficiency can be improved. An adhesive layer 307 in the figure is configured to connect the wire-winding part 302 to the magnetic conductive sheet 701, and the adhesive layer 307 includes an adhesive such as glue.

Figure 4:
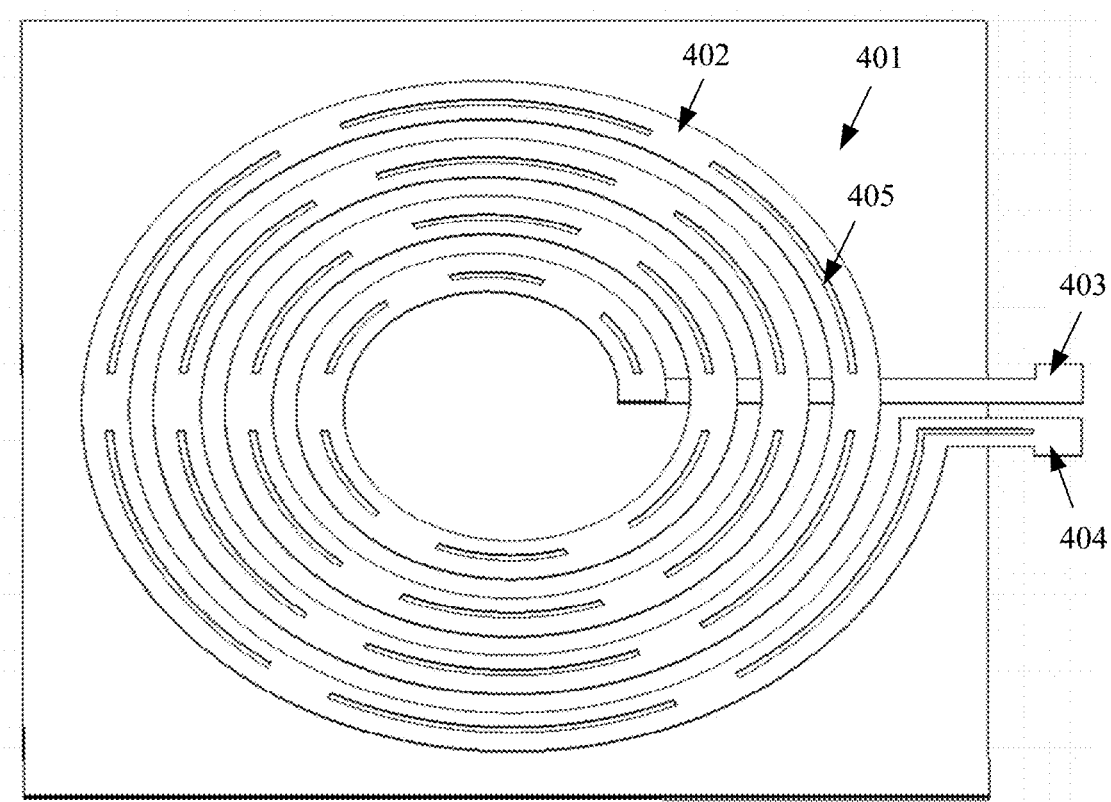
FIG. 4 is a schematic diagram of a coil according to another embodiment of this application.

FIG. 4 is a schematic diagram of a coil according to an embodiment of this application. The coil includes a magnetic conductive sheet 401, an output terminal 404, an input terminal 403, and a wire-winding part 402 that is connected between the output terminal 404 and the input terminal 403. A slot 405 is disposed on the wire-winding part 402, and the slot 405 cuts a part of the wire-winding part 402 into a structure including at least two conductive paths connected in parallel. The wire-winding part 402 is configured to cut through a magnetic field to generate an induced current. The input terminal 403 and the output terminal 404 are configured to connect the wire-winding part 402 to an external circuit, to supply the induced current to the external circuit for use. The wire-winding part 402 is made by spirally winding a metal conductor, and turns of the metal conductor are insulated from each other. At a winding start end and a winding termination end, the wireless charging wire-winding part 402 is connected to the external circuit by the input terminal 403 and the output terminal 404, so that a current passes through the wireless charging coil and forms a magnetic field. The magnetic conductive sheet 401 plays a magnetic conductive role, so that an inductance value of the wire-winding part 402 can be increased. In addition, the magnetic field is prevented from leaking to space below the magnetic conductive sheet, to better shield the space below the magnetic conductive sheet. The magnetic conductive sheet 401 may be made of a magnetic material such as ferrite or amorphous-nanocrystalline. The magnetic conductive sheet 401 is insulated from the wire-winding part 402. In this embodiment of the present invention, a plurality of slots 405 are further included. The slot 405 cuts a part of the metal conductor of the wire-winding part 402 into two small windings having relatively small conductor widths, reducing an eddy current loss in the wire-winding part 402. In particular, there may be a plurality of slots 405 in a width direction of the metal conductor of the wire-winding part 402, and only one slot is shown in this embodiment.

Figure 5:
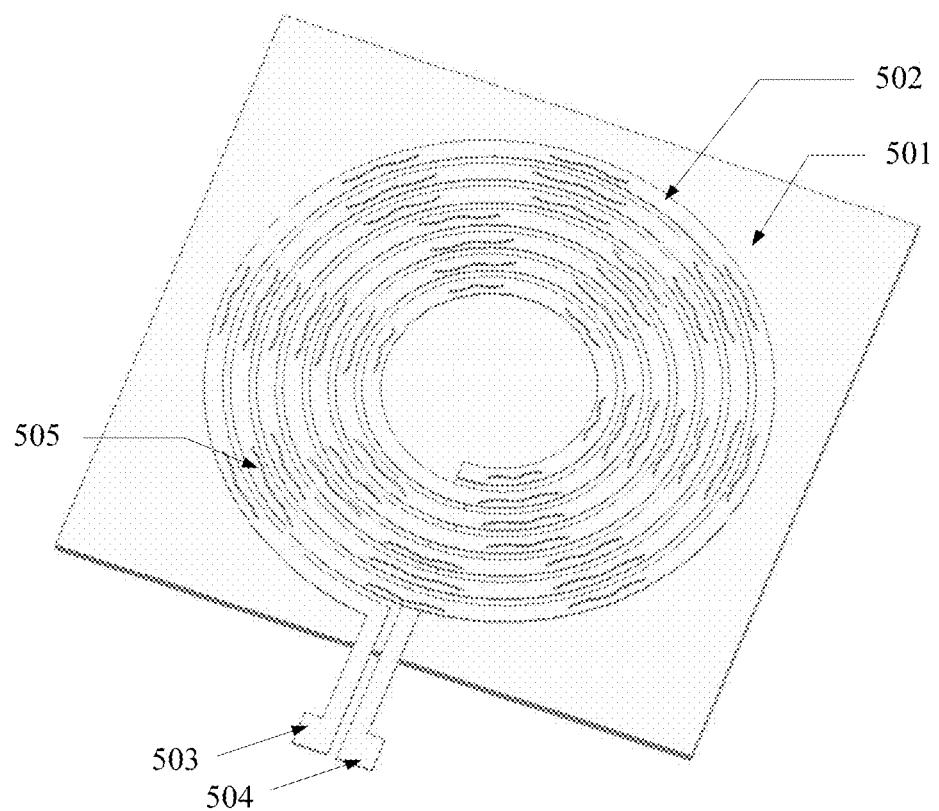
FIG. 5 is a schematic diagram of a coil according to another embodiment of this application.

FIG. 5 shows an electric coil in some embodiments of this application. The electric coil includes a magnetic conductive sheet 501, a wire-winding part 502, an input terminal 503, an output terminal 504, and a slot 505. The wire-winding part 502 is made by spirally winding a metal conductor by a plurality of turns, and the turns of the metal conductor are insulated from each other. At a winding start end and a winding termination end, the wireless charging wire-winding part 502 is connected to an external circuit by the input terminal 503 and the output terminal 504, so that a current passes through a wireless charging coil and forms a magnetic field. The magnetic conductive sheet 501 plays a magnetic conductive role, so that an inductance value of the wire-winding part 502 can be increased. In addition, the magnetic field is prevented from leaking to space below the magnetic conductive sheet 501, to better shield the space below the magnetic conductive sheet 501. The magnetic conductive sheet 501 may be made of a magnetic material such as ferrite or amorphous-nanocrystalline. The magnetic conductive sheet 501 is insulated from the winding 502. In this embodiment of the present invention, a plurality of slots 505 in an irregular shape are further included, and the slots may be in various shapes such as a wavy shape, a jagged shape, and an oblique line shape. The slots shown in this embodiment are in the wavy shape. The slot 505 divides a part of a wound wire of the wire-winding part 502 into two small windings having relatively small conductor widths, reducing an eddy current loss in the wire-winding part 502. Parts that are not cut by the slot 505 and that are of the wire-winding part 502 have relatively large conductor widths, and therefore direct current resistance is relatively small. In this solution, an eddy current loss and a direct current loss can be balanced based on a specific application scenario.

Figure 6:
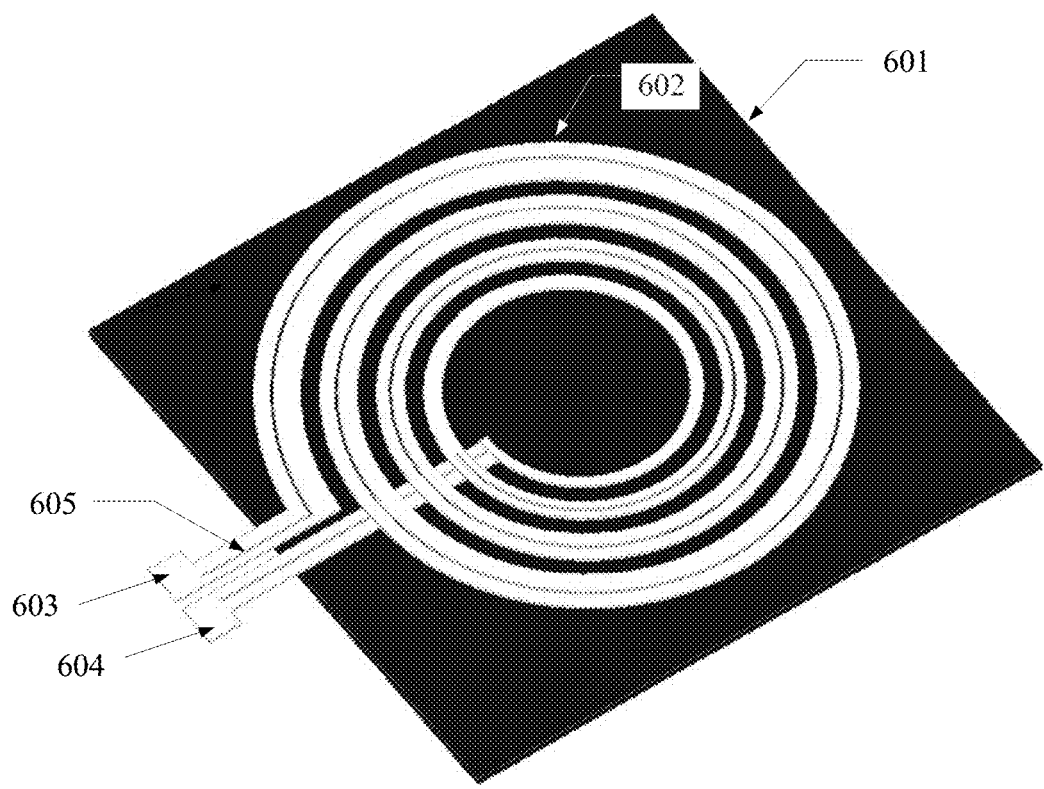
FIG. 6 is a schematic diagram of a coil according to another embodiment of this application.

FIG. 6 shows a coil in some embodiments of this application. The coil includes a magnetic conductive sheet 601, a wire-winding part 602, an input terminal 603, an output terminal 604, and a slot 605. The wire-winding part 602 is made by winding a plurality of turns of metal having unequal widths, and the turns of the metal are insulated from each other. At a winding start end and a winding termination end, the wireless charging wire-winding part 602 is connected to an external circuit by the input terminal 603 and the output terminal 604, so that a current passes through the wireless charging coil and forms a magnetic field. The magnetic conductive sheet 601 plays a magnetic conductive role, so that an inductance value of the wire-winding part 602 can be increased. In addition, the magnetic field is prevented from leaking to space below the magnetic conductive sheet, to better shield the space below the magnetic conductive sheet. The magnetic conductive sheet 601 may be made of one or more magnetic materials such as ferrite or amorphous-nanocrystalline. The magnetic conductive sheet 601 is insulated from the wire-winding part 602. The slot 605 divides the wire-winding part 602 into two windings of relatively small widths at a location, having a relatively large conductor width, of the wire-winding part 602, effectively reducing an eddy current loss in the wire-winding part 602. In addition, in this embodiment, the wire-winding part 602 is made through winding by using windings having unequal widths. Compared with a winding manner using equal widths, in this embodiment, alternating current resistance in the wire-winding part 602 can be effectively reduced, and wireless charging efficiency can be improved.

Figure 7A:
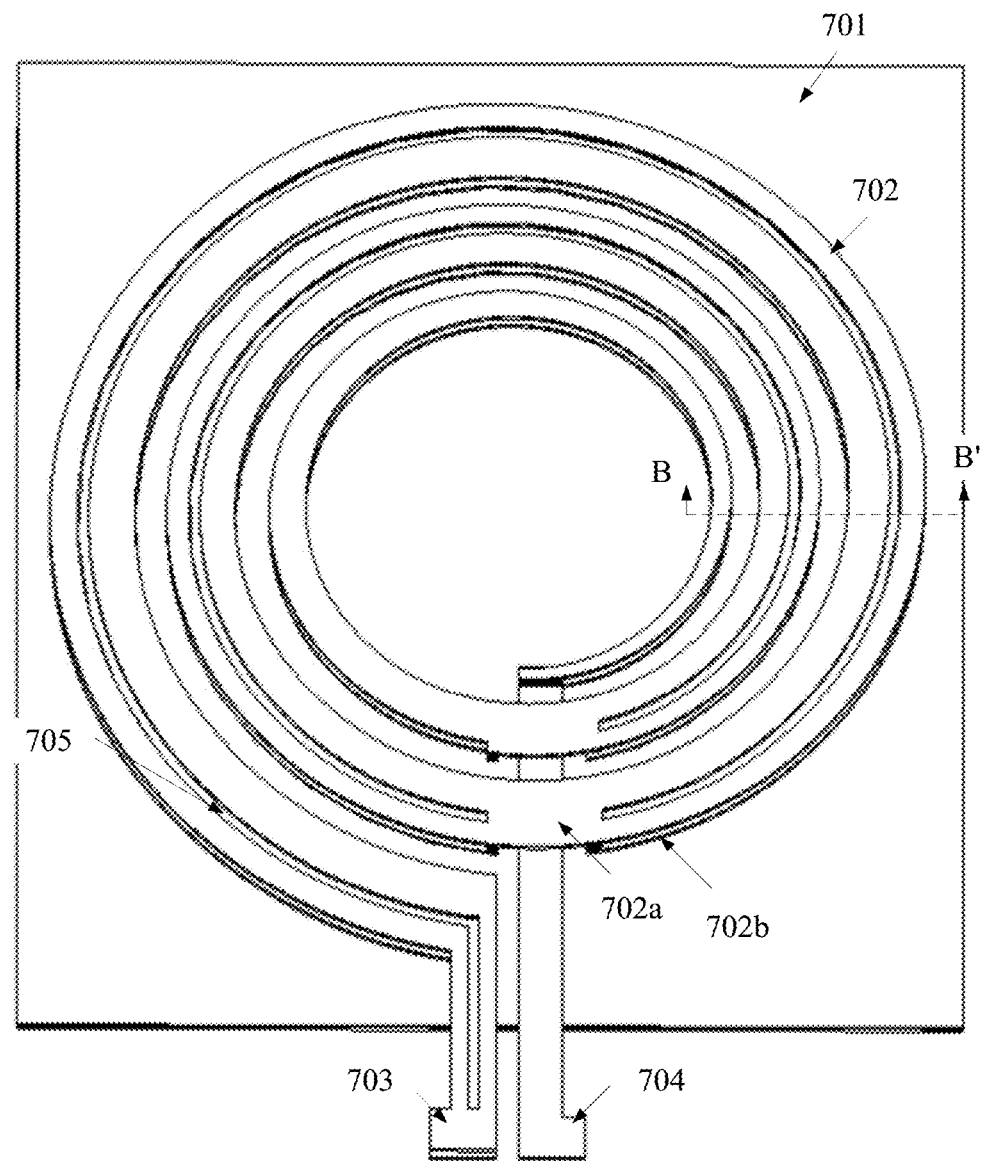
FIG. 7a is a schematic diagram of a coil according to another embodiment of this application.

FIG. 7a shows a coil in some embodiments of this application. The coil includes a magnetic conductive sheet 701, a wire-winding part 702, an input terminal 703, an output terminal 704, and a slot 705. The wire-winding part 702 is made through parallel winding of a first-layer winding 702a and a second-layer winding 702b, and the wire-winding part 702 is connected to an external circuit by using the input terminal 703 and the output terminal 704. The magnetic conductive sheet 701 is located below the second-layer winding 702b, and is insulated from the wire-winding part 702. The magnetic conductive sheet 701 plays a magnetic conductive role, so that an inductance value of the wire-winding part 702 can be increased. In addition, a magnetic field is prevented from leaking to space below the magnetic conductive sheet, to better shield the space below the magnetic conductive sheet 701. The magnetic conductive sheet 701 may be made of one or more magnetic materials such as ferrite or amorphous-nanocrystalline. The second-layer winding 702b and the magnetic conductive sheet 701 are connected by using an adhesive, for example, by using glue.

Figure 7B:
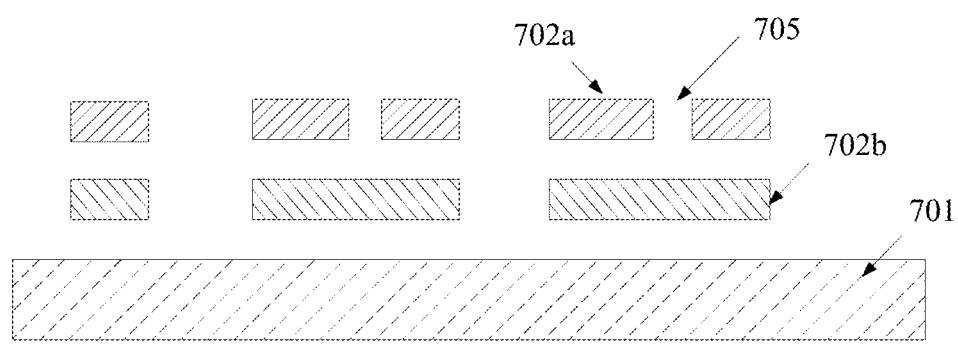
FIG. 7b is a schematic diagram of a coil according to another embodiment of this application.

FIG. 7b is a schematic diagram of a section of the coil in FIG. 7a at a BB' location. The slot 705 divides the first-layer winding 702a into two windings having relatively small conductor widths, and the second-layer winding 702b is a complete winding having a relatively large conductor width. In this embodiment, only 702a is cut by the slot 705 into two windings having relatively small conductor widths. In another application, similar to 702a, 702b may also be cut into two windings having relatively small conductor widths, and the slot 705 may cut only a part of winding of the wire-winding part 702 by using a method similar to the method shown in Embodiment 2.

Figure 8:
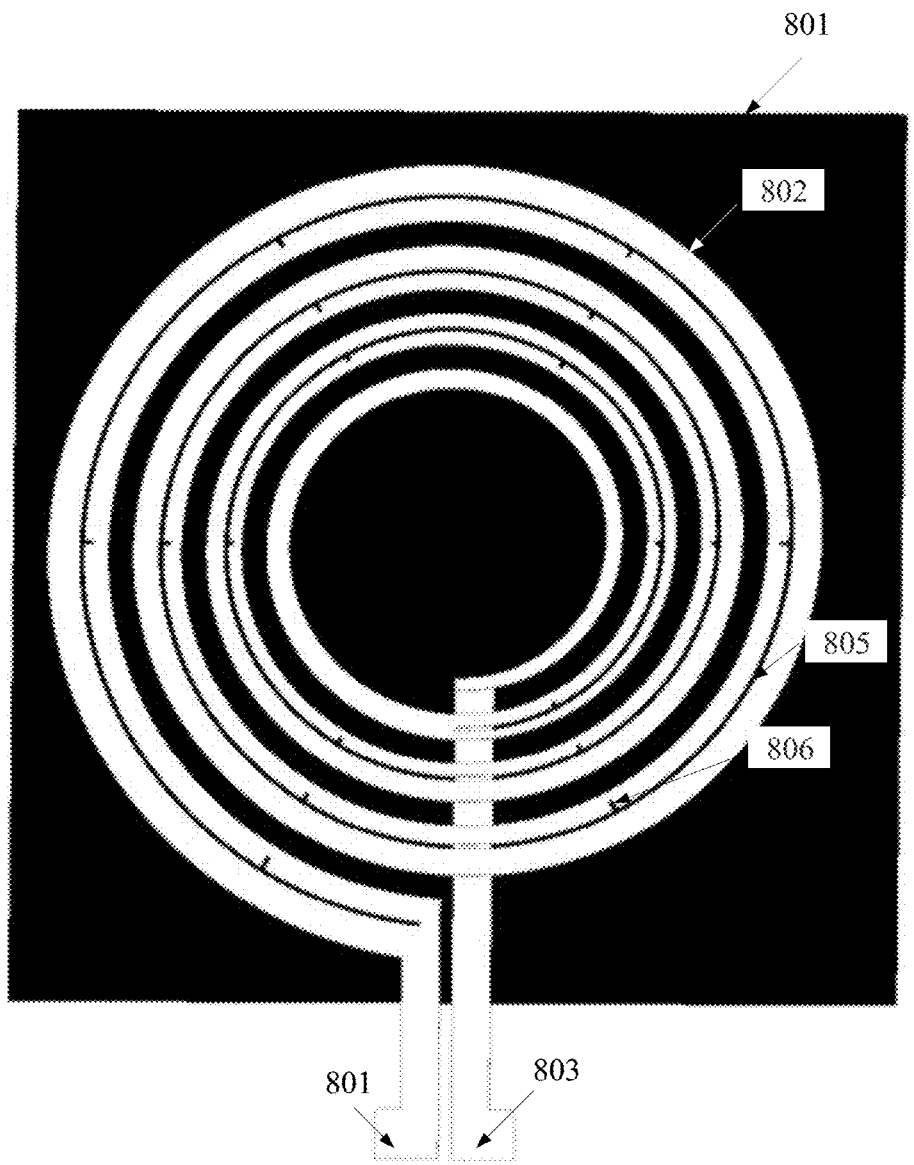
FIG. 8 is a schematic diagram of a coil according to another embodiment of this application.

FIG. 8 shows a coil in some embodiments of this application. The coil includes a magnetic conductive sheet 801, a wire-winding part 802, an input terminal 803, an output terminal 804, and slots 805 and 806. The wire-winding part 802 is made by spirally winding a metal conductor by a plurality of turns, and the turns of the metal conductor are insulated from each other. At a winding start end and a winding termination end, the wireless charging wire-winding part 802 is connected to an external circuit by the input terminal 803 and the output terminal 804, so that a current passes through a wireless charging coil and forms a magnetic field. The magnetic conductive sheet 801 plays a magnetic conductive role, so that an inductance value of the wire-winding part 802 can be increased. In addition, the magnetic field is prevented from leaking to space below the magnetic conductive sheet, to better shield the space below the magnetic conductive sheet. The magnetic conductive sheet 801 may be made of a magnetic material such as ferrite or amorphous-nanocrystalline. In this embodiment of the present invention, a slot in a "comb-shaped" structure formed by the slots 805 and 806 is further included. The slots 805 are arranged in a winding direction and a metal width direction, so that a width of the wire-winding part 802 can be reduced. Cut-line slots of the slots in a width direction of the winding of the wire-winding part 802 can effectively cut off an eddy current path. Therefore, the "comb-shaped" slot can effectively cut off the eddy current path in the wire-winding part 802, and an eddy current loss can be reduced. The slots may completely cut through the wire-winding part 802 in a metal thickness direction, or may cut only a part in a metal thickness direction. The slots may be implemented in a mechanical etching, laser etching, or chemical reaction corrosion manner.

Figure 9:
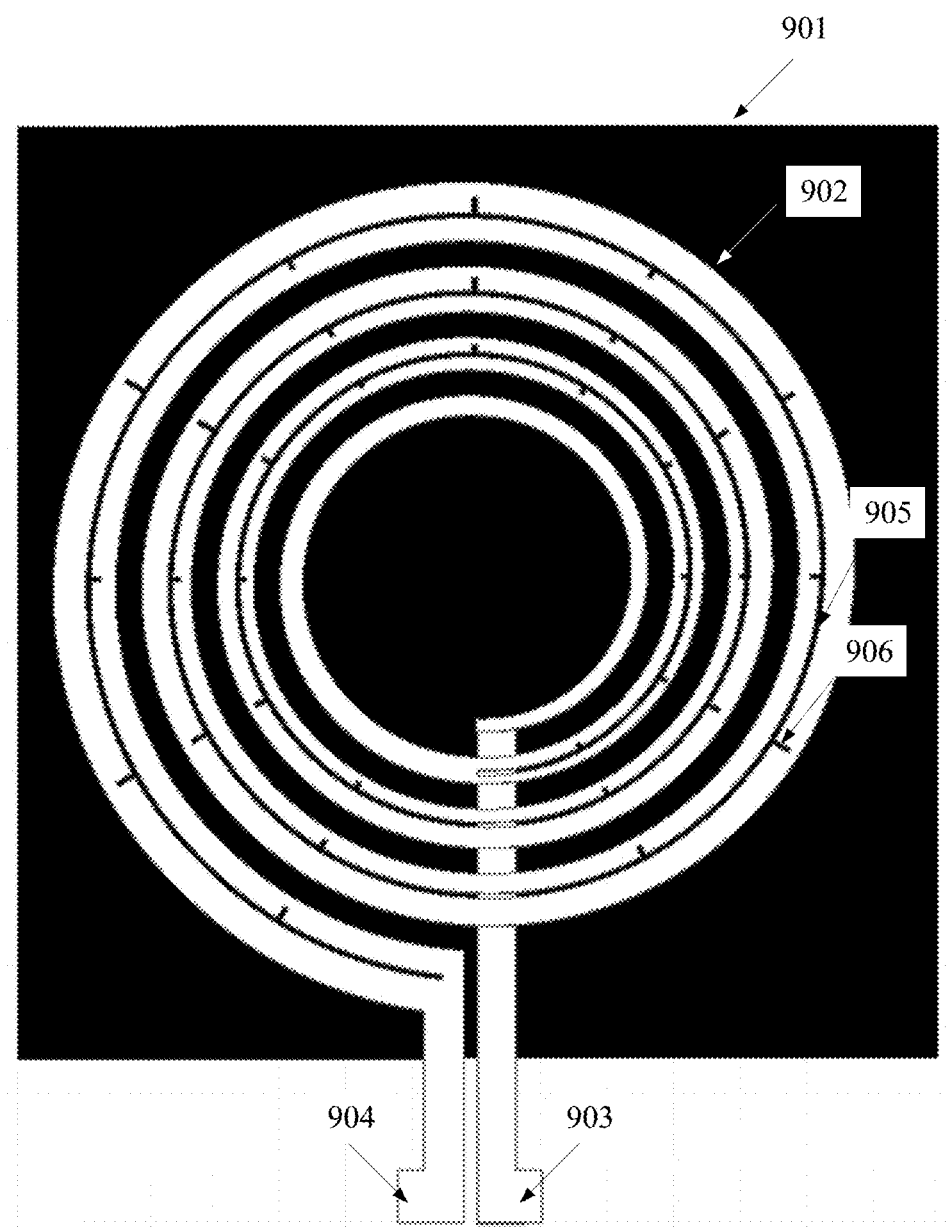
FIG. 9 is a schematic diagram of a coil according to another embodiment of this application.

FIG. 9 shows an embodiment of a structure of a comb-shaped slot. There are a plurality of slots 906 in a width direction of a metal winding, and the slots are distributed on two sides of a slot 905, and respectively point to an outer side of the winding and an inner side of the winding, so that eddy current losses in inner and outer small windings obtained after each turn of the metal winding is cut by the slot 905 can be effectively reduced.

Figure 10:
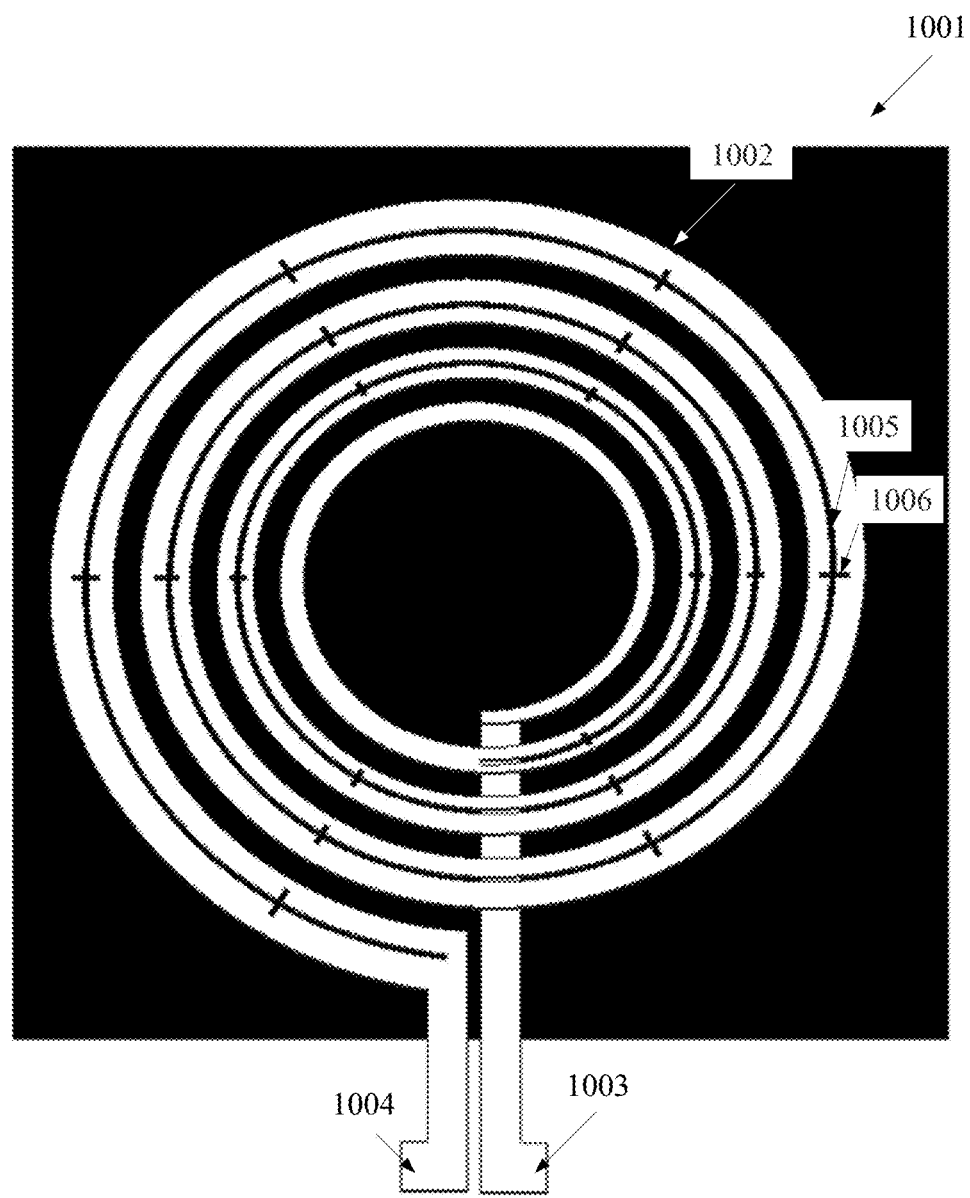
FIG. 10 is a schematic diagram of a coil according to another embodiment of this application.

FIG. 10 shows an embodiment of a structure of another comb-shaped slot. Slots 1006 in a width direction of a metal winding of a coil and a slot 1005 in a winding direction of the metal winding intersect, so that the entire slot cuts the coil in a shape of " II· ". The slot in the shape of "two connected crosses" is disposed, so that an eddy current loss can be reduced by disposing only a small quantity of slots.

Figure 11:
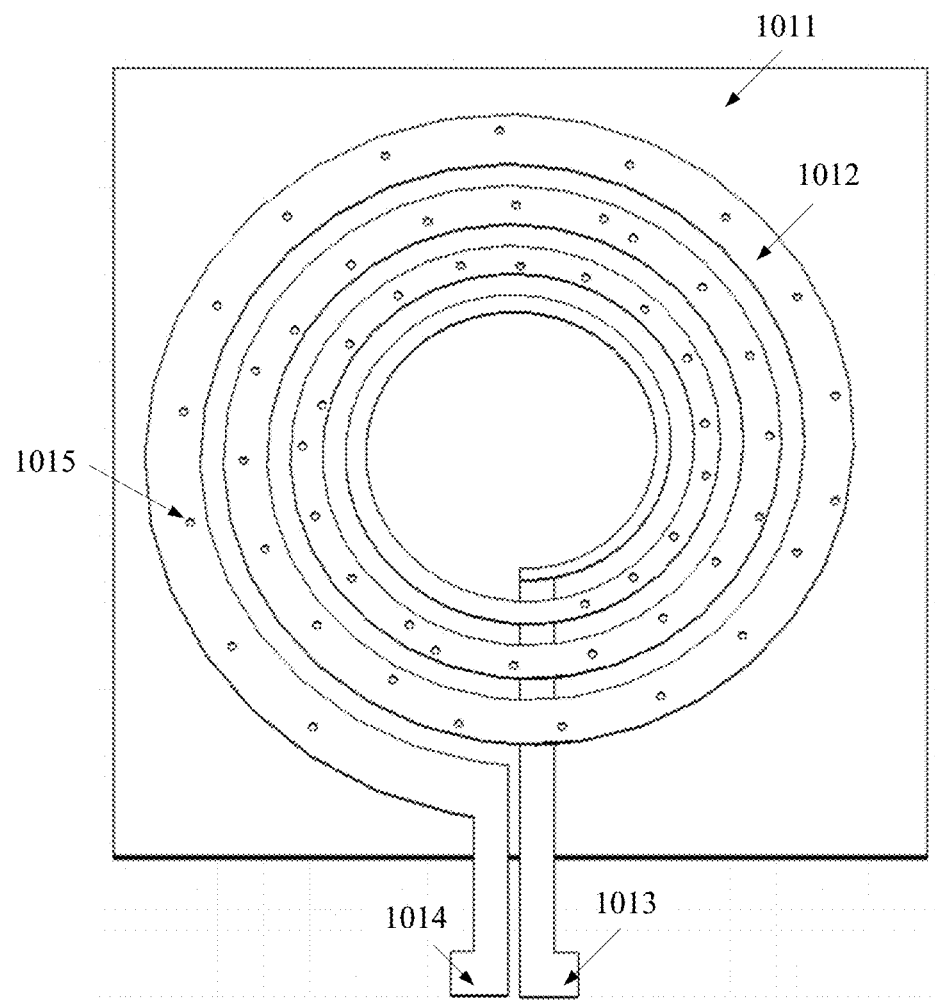
FIG. 11 is a schematic diagram of a coil according to another embodiment of this application.

As shown in FIG. 11, in an embodiment, slots 1015 are through holes. A plurality of slots 1015 are distributed on a wire-winding part 1012, so that an eddy current loss can be reduced. A through-hole shape of the slot 1015 may be a round shape, a square shape, a "cross" shape, or another polygon shape. A quantity of slots 1015 distributed on each turn of a metal conductor on the wire-winding part 1012 and an arrangement manner may be determined based on a size of a nearby magnetic field. The slot in the round shape, the square shape, the "cross" shape, or another polygon shape is disposed, so that an eddy current loss can be reduced by disposing only a small quantity of slots.

Figure 12:
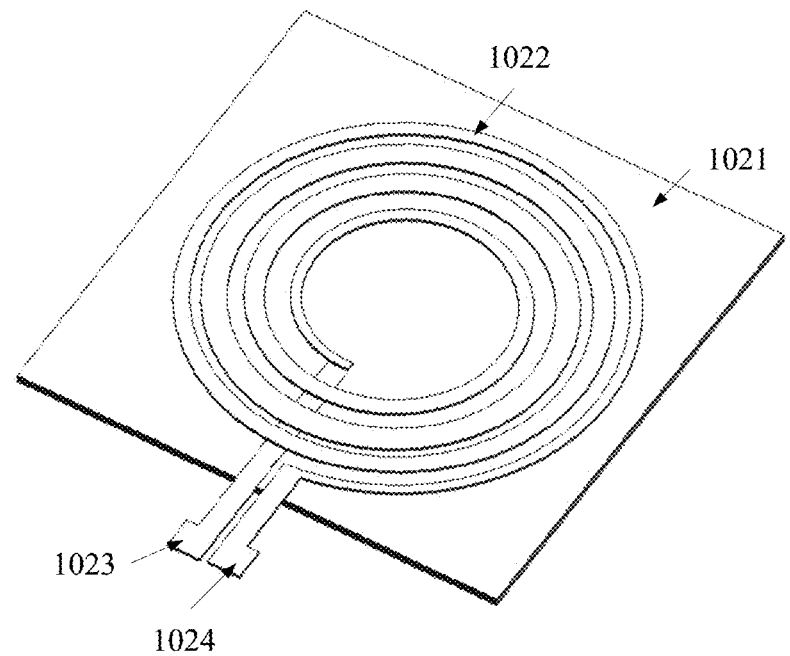
FIG. 12 is a schematic diagram of a coil according to another embodiment of this application.

As shown in FIG. 12, in another embodiment of this application, a width of a wire-winding part 1022 is optimized based on a strength of a magnetic field near a coil in a wireless charging process, to reduce a loss in the coil. 1021 represents a magnetic conductive sheet that may be specifically made of a material such as ferrite or amorphous-nanocrystalline. The wire-winding part 1022 is made by spirally winding a metal conductor by a plurality of turns. In the plurality of turns of the coil, a width of an inner ring of the metal conductor is relatively small, and when a winding outer diameter of the coil increases, a width of the conductor first increases and then decreases. Therefore, an overall characteristic of a width of the coil of the wire-winding part 1022 is as follows: Conductor widths of an inner ring and an outer ring are relatively small, and a conductor width of a conductor at a middle location is relatively large, and a specific value of the width may be designed based on an actual application scenario. An input terminal 1023 and an output terminal 1024 are connected to an external circuit. When a current passes through the coil, a magnetic field is generated to couple the coil to another coil, to wirelessly transmit electric energy.

Figure 13:
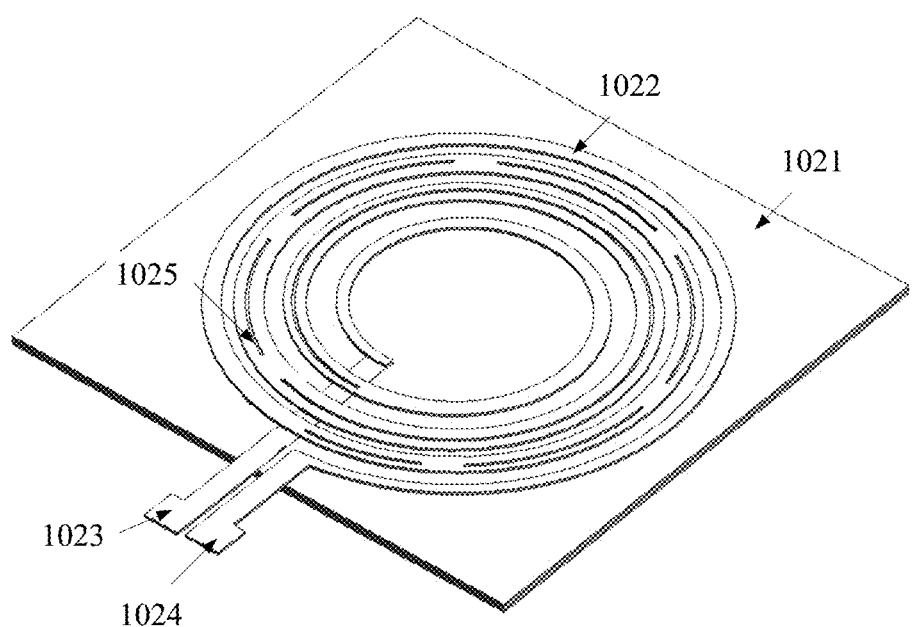
FIG. 13 is a schematic diagram of a coil according to another embodiment of this application.

As shown in FIG. 13, slots 1025 are added to the wire-winding part 1022. The slots 1025 each cut a part, having a relatively large conductor width, of the metal conductor of the wire-winding part 1022, and cut the conductor having the relatively large conductor width into two or more conductors having relatively small conductor widths, to effectively reduce an eddy current loss at this location, and further reduce a loss in the coil.

Figure 14:
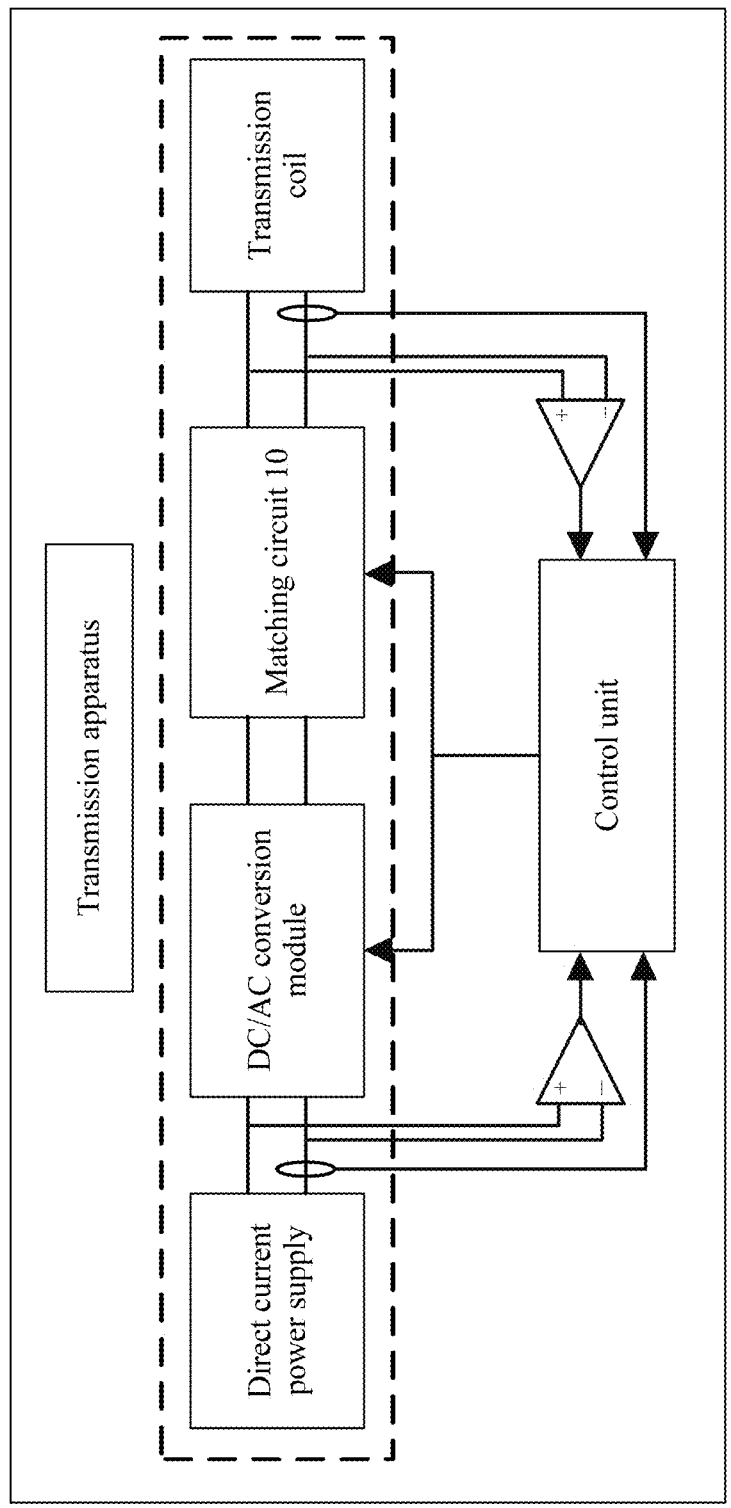
FIG. 14 is a schematic diagram of a wireless charging transmission apparatus according to another embodiment of this application.

FIG. 14 shows a wireless charging transmission apparatus of a mobile terminal in some embodiments of this application. The wireless charging transmission apparatus includes a direct current power supply, a DC/AC conversion module, a matching circuit, a transmission coil, and a control unit, and the transmission coil is any one of the coils described in the foregoing embodiments.

The control unit is configured to control the DC/AC conversion module to convert a signal of the direct current power supply into an alternating current signal, and control the alternating current signal to pass through the matching circuit and the transmission coil, so that the transmission coil transmits alternating current energy.

The wireless charging receiving coil is at least one of the coils shown in FIG. 3a, FIG. 3b, and FIG. 4 to FIG. 13.

In the solution of this application, the slot is disposed on the transmission coil of the wireless charging transmission apparatus, and a wire-winding part of the transmission coil is cut or partially cut, so that when the wireless charging transmission apparatus works in a wireless charging alternating current magnetic field, under the action of the wireless charging alternating current magnetic field, alternating current resistance in the transmission coil is reduced, reducing an energy loss in the transmission coil.

Figure 15A:
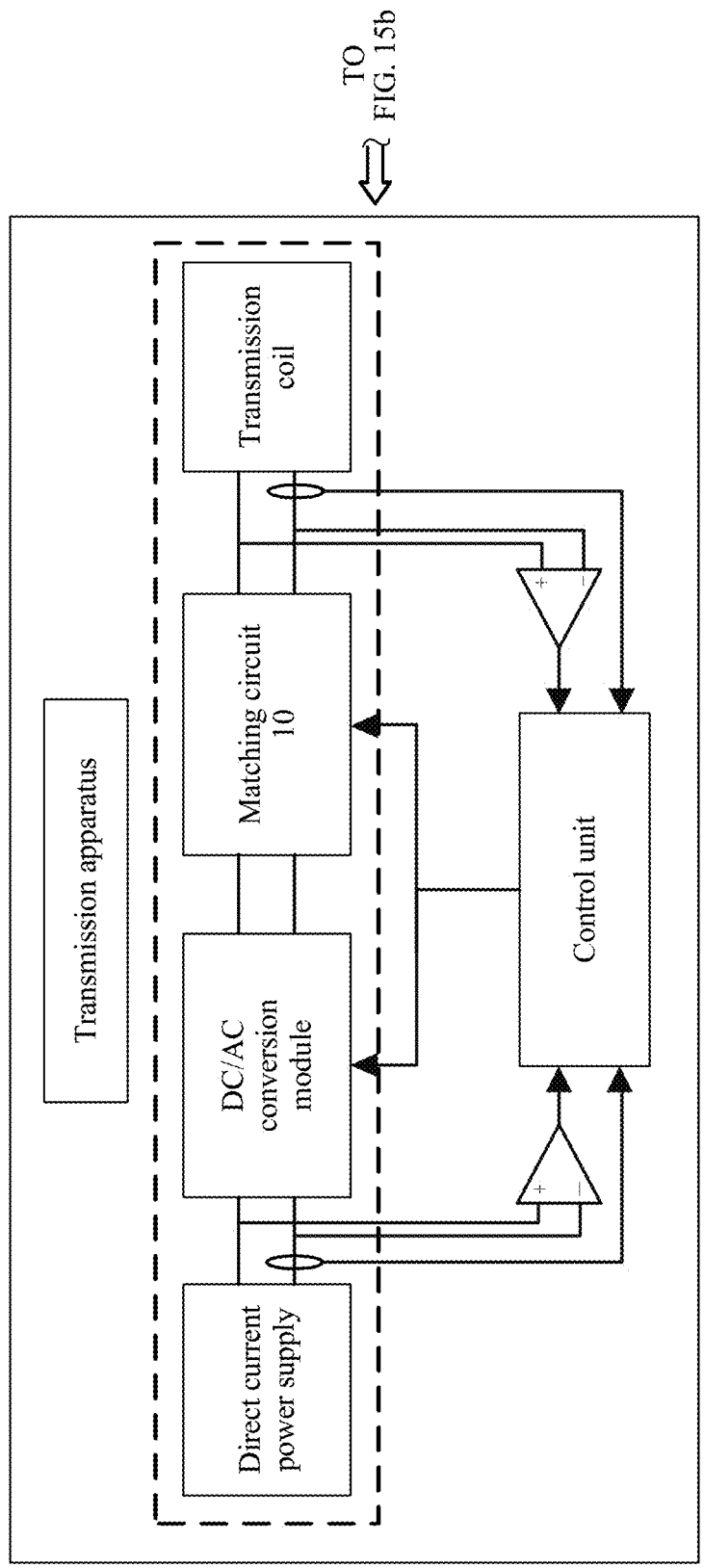
FIG. 15a and FIG. 15b are a schematic diagram of a wireless charging system according to another embodiment of this application.
Figure 15B:
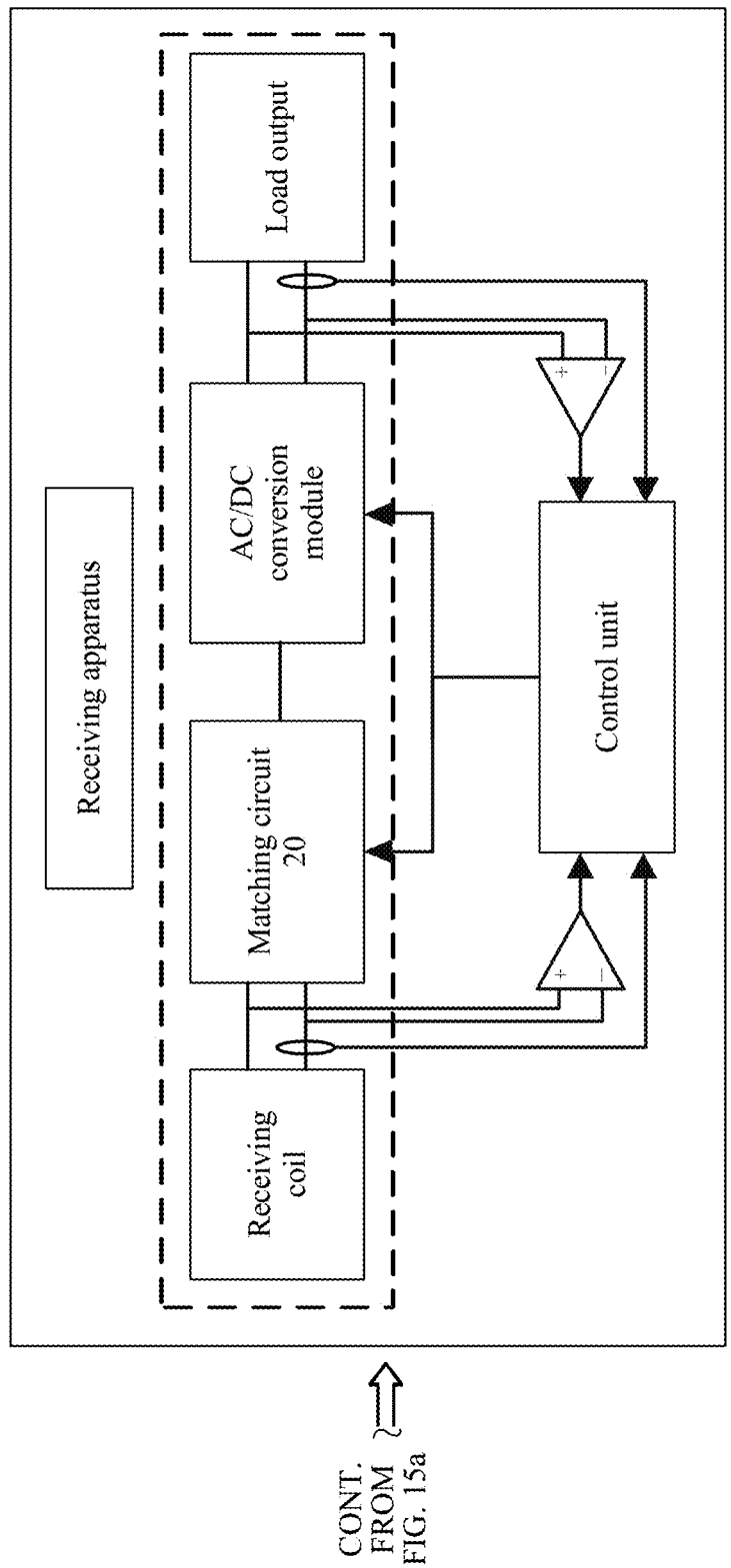

FIG. 15a and FIG. 15b show a wireless charging system of a mobile terminal in some embodiments of this application. The wireless charging system includes a wireless charging receiving apparatus of the mobile terminal and a wireless charging transmission apparatus of the mobile terminal. The wireless charging transmission apparatus of the mobile terminal is configured to charge the wireless charging receiving apparatus of the mobile terminal.

The wireless charging transmission apparatus of the mobile terminal includes a direct current power supply, a DC/AC conversion module, a matching circuit 10, a transmission coil, and a control unit. The wireless charging receiving apparatus of the mobile terminal includes a receiving coil, a matching circuit 20, an AC/DC conversion module, a control unit, and a load.

The DC/AC conversion module converts the direct current power supply into an alternating current signal. The alternating current signal flows through the matching circuit 10 and the transmission coil. The transmission coil sends the alternating current signal to the receiving coil in the wireless charging receiving apparatus of the mobile terminal. The alternating current signal received by the receiving coil is transmitted to the AC/DC conversion module through the receiving coil and the matching circuit 20. The AC/DC conversion module converts the received alternating current signal into a direct current signal, to supply power to the load. The control unit of the wireless charging transmission apparatus of the mobile terminal controls working of the transmission coil, and the control unit of the wireless charging receiving apparatus of the mobile terminal controls working of the receiving coil.

At least one of the transmission coil and the receiving coil is at least one of the coils shown in FIG. 3a, FIG. 3b, and FIG. 4 to FIG. 13.

Specifically, in this application, a slot is disposed on the receiving coil, so that thickness of the receiving coil is reduced or a cross-sectional area is reduced, and direct current resistance in the coil is increased to some extent. However, in a wireless charging scenario, approximately 50% to 100% of alternating current resistance in the coil is not caused by the direct current resistance in the coil, and this part of resistance is actually an equivalent resistance, namely, an eddy current resistance, that is lost because a current is generated in a metal conductor of the coil when a magnetic field generated in a wireless charging process cuts through the metal conductor. When the metal conductor of the coil is cut through by the wireless charging magnetic field, an eddy current closed-loop path is generated in the metal conductor of the coil, and this part of eddy current cannot form an effective output current in the coil, and increases an energy loss in the coil. The coil is cut or partially cut, so that the eddy current closed-loop path that is generated when the metal conductor of the coil is cut through by the wireless charging magnetic field can be cut off, reducing an eddy current loss in the receiving coil. In addition, in this application, the coil is cut, so that a decrease amplitude of the energy loss generated by the eddy current in the receiving coil is greater than a loss caused by an increase in the direct current resistance in the coil, reducing a loss of the alternating current resistance in the coil on the whole.

In short, the slot is disposed on the receiving coil, so that the closed-loop path generated by the eddy current in the metal conductor of the coil is cut off, and resistance caused by the eddy current in the receiving coil is greatly reduced. In addition, a decrease amplitude of the resistance caused by the eddy current is greater than an increase amplitude of the direct current resistance, so that the alternating current resistance in the coil in the wireless charging scenario is reduced on the whole. In this application, a ratio of the alternating current resistance to the direct current resistance in the coil is approximately 1.3, so that a percentage of the resistance generated by the eddy current in the coil is greatly reduced, a loss in the coil is reduced, and charging efficiency is improved. In particular, in a charging status in which a mobile phone does not exactly face a wireless charger, an eddy current path generated by magnetic lines in the coil in the wireless charging process is cut off, where an angle between a plane of the coil and the magnetic lines is relatively large, so that an eddy current loss generated by a wireless charging magnetic field in the coil can be greatly reduced.

At least one of the transmission coil and the receiving coil shown in FIG. 15a and FIG. 15b is used as the coil in this application, improving wireless charging efficiency. In this solution, the slot is disposed on the receiving coil in the wireless charging receiving apparatus of the mobile terminal or the transmission coil of the wireless charging transmission apparatus of the mobile terminal, so that the direct current resistance in the coil is increased to some extent, and the alternating current resistance in the coil is also increased. However, in the wireless charging scenario, approximately 50% to 100% of the alternating current resistance in the coil is not caused by the direct current resistance in the coil, and this part of resistance is actually caused by cutting the coil by the wireless charging magnetic field. When a wire-winding part of the receiving coil or the transmission coil is cut or partially cut, an eddy current generated when the coil is cut by the wireless charging magnetic field can be cut off, to reduce a final alternating current resistance in the receiving coil or the transmission coil. In short, the slot is disposed on the coil, so that impact caused by the eddy current on the resistance in the coil is greatly reduced, and finally, the alternating current resistance in the coil is greatly reduced. In this application, a ratio of the alternating current resistance to the direct current resistance in the coil is approximately 1.3 after optimization, greatly reducing a percentage of the eddy current resistance. In conclusion, the slot is disposed, so that the eddy current resistance is reduced. In addition, a decrease amplitude of the eddy current resistance is greater than an increase amplitude of the direct current resistance, so that the alternating current resistance in the wireless charging receiving coil or the transmission coil is reduced, and charging efficiency is improved.

Further, when the transmission coil and the receiving coil horizontally deviate from each other by a particular distance, most magnetic lines are perpendicular to a plane of the transmission coil or the receiving coil, or an eddy current loss in the transmission coil or the receiving coil is increased rapidly because an angle between most magnetic lines and a plane of the coil is relatively large. Consequently, when the transmission coil and the receiving coil deviate from each other during wireless charging, overall wireless charging efficiency is reduced, and is obviously lower than that when the two coils do not deviate from each other horizontally. In addition, when the transmission coil and the receiving coil horizontally deviate from each other by a long distance, to keep a same output power, a current larger than a current generated when the transmission coil and the receiving coil do not deviate from each other needs to pass through the transmission coil on a transmit side. Consequently, an alternating current magnetic field is stronger, and a loss in the coil is greater. In prior approaches, a problem of a loss in a case of deviation cannot be resolved by optimizing a conductor width. Consequently, in an existing technical solution of wireless charging, charging efficiency obtained when the transmission coil and the receiving coil deviate from each other is obviously lower than charging efficiency obtained when the two coils exactly face each other. In the technical solution of this application, a technical solution is proposed for low charging efficiency obtained when the transmission coil and the receiving coil horizontally deviate from each other by a long distance during wireless charging, to effectively reduce losses in the coils caused when there is a large horizontal deviation, increase a degree of freedom in horizontal space during wireless charging, and improve charging experience of a user.

Specifically, analysis of charging efficiency is verified through simulation. For example, in this solution, a slot is disposed to cut off an eddy current path in a coil having a relatively large width, to effectively reduce a loss generated in the coil in a wireless charging process, and improve wireless charging efficiency. The following table shows wireless charging efficiency obtained when a wireless charging receiving coil uses an existing technical solution of a coil having unequal widths and charging efficiency obtained when the wireless charging receiving coil uses a solution of a coil having unequal widths in the technology in the present invention. A test result indicates that the technology in the embodiments of the present invention effectively improve the wireless charging efficiency. When winding center locations of two coils horizontally deviate from each other by 10 mm, efficiency is improved by 5.19%.

| Charging efficiency comparison | Prior approach 1 | Prior approach 2 | Solution of embodiments in this application |
|---|---|---|---|
| A receiving coil exactly faces a transmission coil. | 86.00% | 86.50% | 87.00% |
| A receiving coil horizontally deviates from a transmission coil by 10 mm. | 72.80% | 75.70% | 80.51% |

Figure 16A:
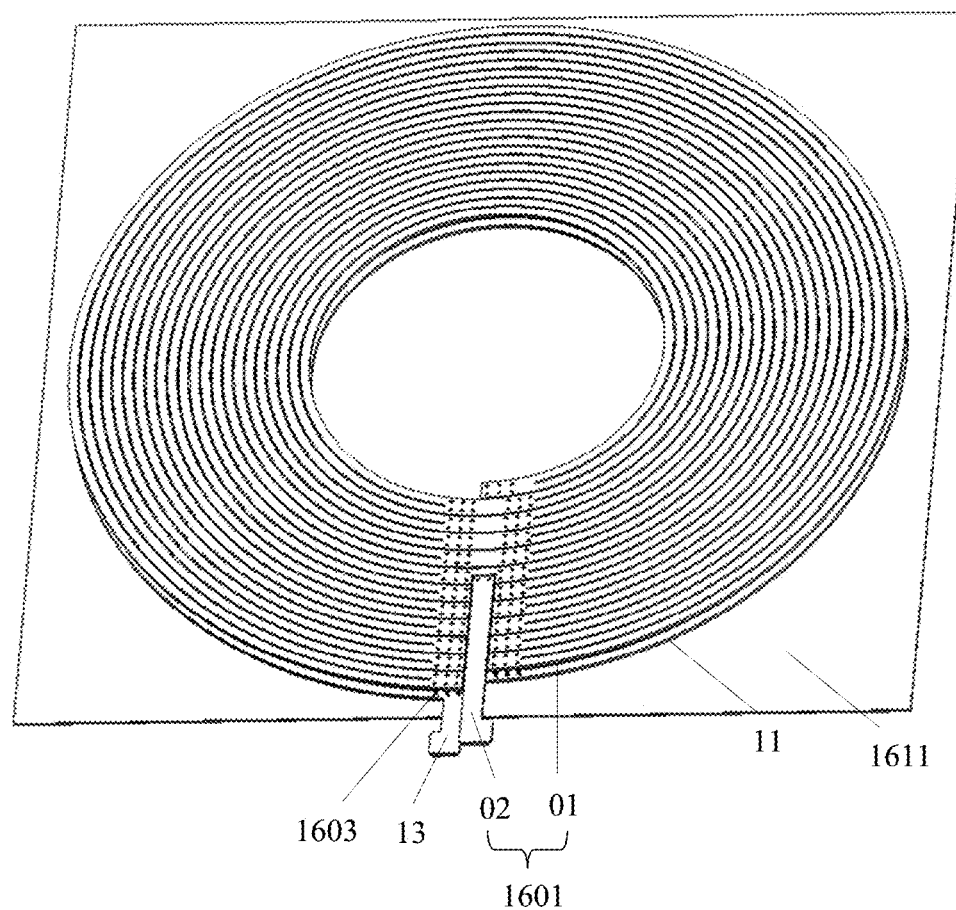
FIG. 16a and FIG. 16b are schematic diagrams of a coil according to another embodiment of this application.
Figure 16B:
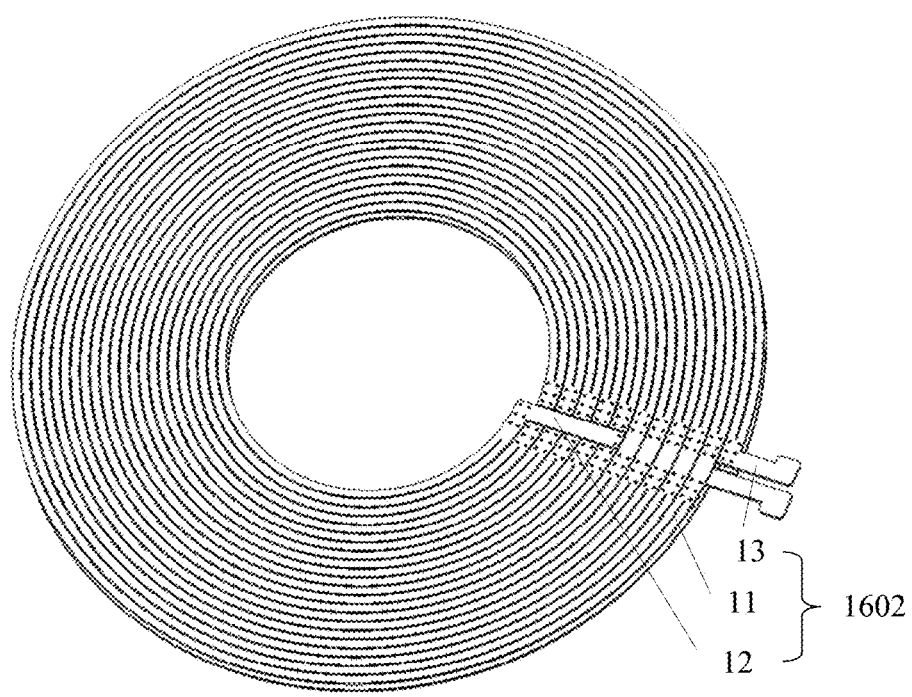

FIG. 16a and FIG. 16b are schematic diagrams of a coil according to another embodiment of this application. This embodiment includes a first conductive layer 1601, a second conductive layer 1602, a plurality of metal through holes 1603, and a magnetic conductive sheet 1611. Specifically, FIG. 16a is a top view in a direction of the first conductive layer 1601, and FIG. 16b is a top view in a direction of the second conductive layer 1602. The first conductive layer includes a first-layer wire-winding part 01 and a first part 02 of an output terminal, and the second conductive layer includes a second-layer wire-winding part 11, a second part 12 of the output terminal, and an input terminal 13. One end of the second part 12 of the output terminal is connected to an innermost ring of the second-layer wire-winding part 11, and extends towards an outer ring to a location between an innermost coil and an outermost coil of the second-layer wire-winding part 11. The other end of the second part 12 of the output terminal is connected to one end of the first part 02 of the output terminal in the first conductive layer via the metal through hole 1603. The first part 02 of the output terminal and the second part 12 of the output terminal are connected in series to form the output terminal of the coil, and the other end of the first part 02 of the output terminal is connected to an external circuit. The first-layer wire-winding part 01 and the second-layer wire-winding part 11 are respectively cut off at a junction between the first-layer wire-winding part 01 and the output terminal and a junction between the second-layer wire-winding part 11 and the output terminal. In addition, the first-layer wire-winding part 01 and the second-layer wire-winding part 11 are connected in parallel on cut parts via the metal through holes 1603. Any one of the foregoing cut slots may be disposed on the first-layer wire-winding part 01 and the second-layer wire-winding part 11. One end of the input terminal 13 is connected to an outer ring of the second-layer wire-winding part 11, and the other end is connected to the external circuit. The magnetic conductive sheet 1611 is located below the second conductive layer, and is insulated from the second conductive layer. The magnetic conductive sheet 1611 plays a magnetic conductive role, so that an inductance value of the coil can be increased. In addition, a magnetic field is prevented from leaking to space below the magnetic conductive sheet, to better shield the space below the magnetic conductive sheet 1611. The magnetic conductive sheet 1611 may be made of one or more magnetic materials such as ferrite or amorphous-nanocrystalline.

Figure 17A:
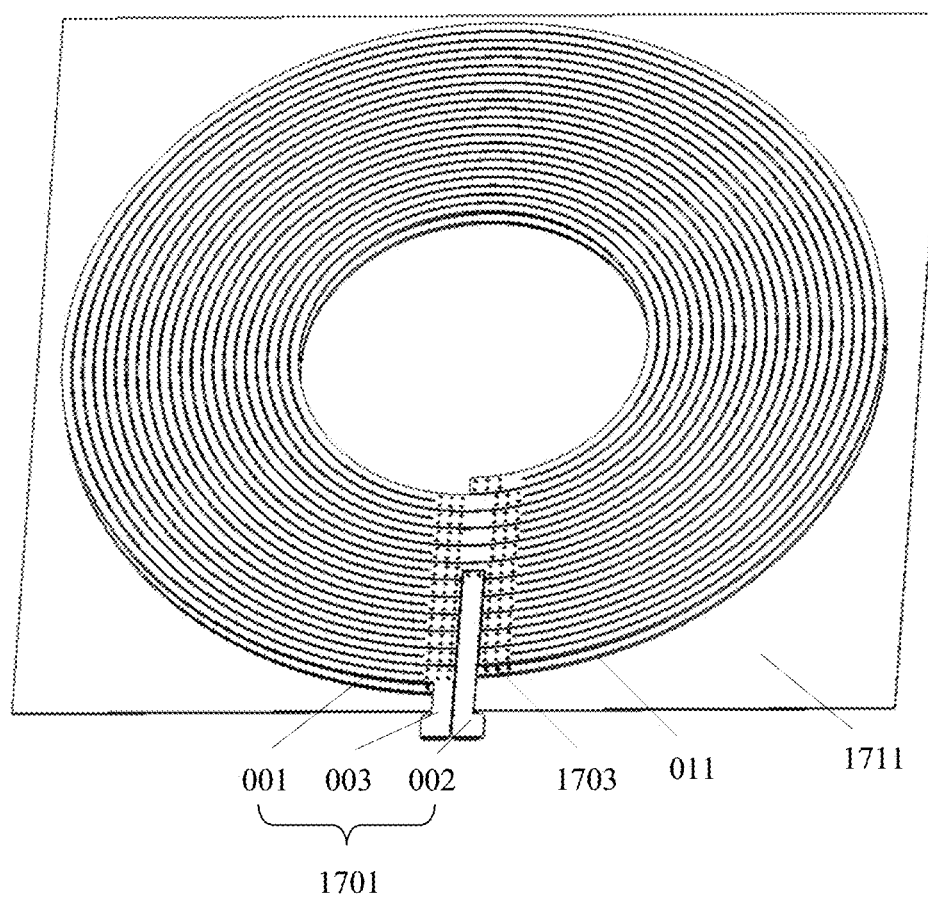
FIG. 17a and FIG. 17b are schematic diagrams of a coil according to another embodiment of this application.
Figure 17B:
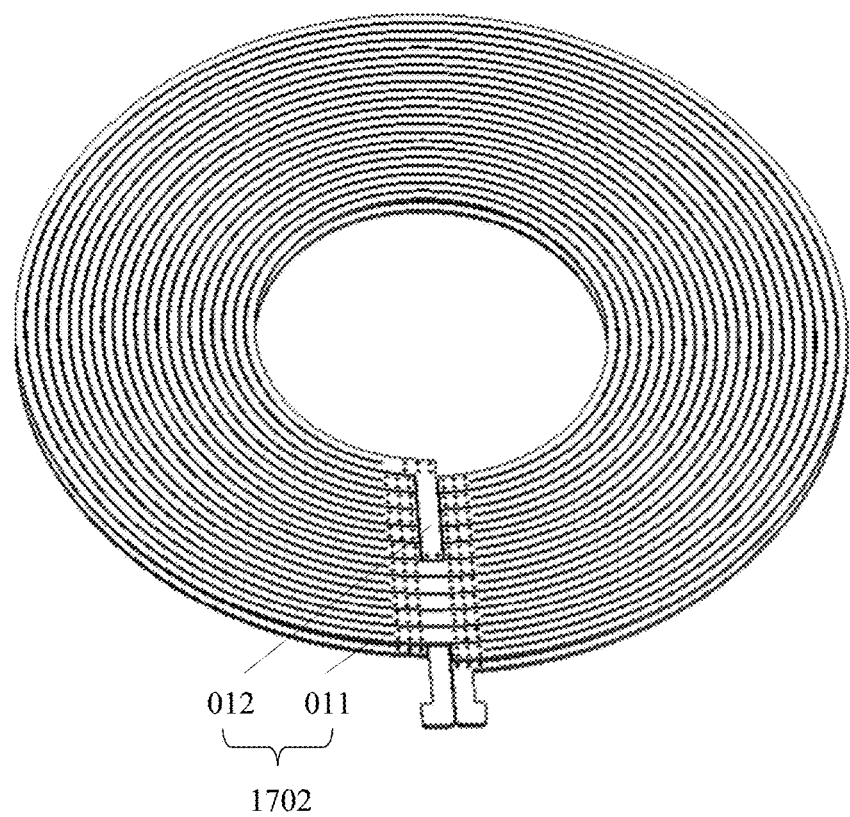

FIG. 17a and FIG. 17b are schematic diagrams of a coil according to another embodiment of this application. This embodiment includes a first conductive layer 1701, a second conductive layer 1702, a plurality of metal through holes 1703, and a magnetic conductive sheet 1711. Specifically, FIG. 17a is a top view in a direction of the first conductive layer 1701, and FIG. 17b is a top view in a direction of the second conductive layer 1702. The first conductive layer includes a first-layer wire-winding part 001, a first part 002 of an output terminal, and an input terminal 003, and the second conductive layer includes a second-layer wire-winding part 011 and a second part 012 of the output terminal. One end of the second part 012 of the output terminal is connected to an innermost ring of the second-layer wire-winding part 011, and extends towards an outer ring to a location between an innermost coil and an outermost coil of the second-layer wire-winding part 011. The other end of the second part 012 of the output terminal is connected to one end of the first part 002 of the output terminal in the first conductive layer via the metal through hole 1703. The first part 002 of the output terminal and the second part 012 of the output terminal are connected in series to form the output terminal of the coil, and the other end of the first part 002 of the output terminal is connected to an external circuit. The first-layer wire-winding part 001 and the second-layer wire-winding part 011 are respectively cut off at a junction between the first-layer wire-winding part 001 and the output terminal and a junction between the second-layer wire-winding part 011 and the output terminal. In addition, the first-layer wire-winding part 001 and the second-layer wire-winding part 011 are connected in parallel on cut parts via the metal through holes 1703. Any one of the foregoing cut slots may be disposed on the first-layer wire-winding part 001 and the second-layer wire-winding part 011. One end of the input terminal 003 is connected to a terminal of an outer ring of the first-layer wire-winding part 001, and the other end is connected to the external circuit. The magnetic conductive sheet 1711 is located below the second conductive layer, and is insulated from the second conductive layer. The magnetic conductive sheet 1711 plays a magnetic conductive role, so that an inductance value of the coil can be increased. In addition, a magnetic field is prevented from leaking to space below the magnetic conductive sheet, to better shield the space below the magnetic conductive sheet 1711. The magnetic conductive sheet 1711 may be made of one or more magnetic materials such as ferrite or amorphous-nanocrystalline.

The foregoing descriptions are merely specific implementations of embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A coil, comprising:
an output terminal;
an input terminal; and
a wire-winding part that is connected between the output terminal and the input terminal,
wherein a slot is disposed on at least a part of the wire-winding part, the slot is disposed between outer edges of a width of the wire winding part at the at least a portion of the wire winding at which the slot is disposed, and a depth of the slot of the wire-winding part is less than or equal to the width of the wire-winding part, to reduce an eddy current loss caused in the coil by a magnetic field, wherein the slot comprises at least two portions, wherein a first portion of the slot cuts through the wire-winding part of the coil, and wherein a second portion of the slot has a preset depth disposed on the second portion of the wire-winding part of the coil, the preset depth less than a depth of the wire-winding part,
wherein the wire-winding part is a metal conductor made through spiral winding,
wherein the input terminal and the output terminal are configured to connect the wire-winding part to an external circuit.

2. The coil according to claim 1, wherein:
the slot extends in a winding length direction of the wire-winding part, and a length of the slot is equal to a length of the wire-winding part; or
the slot is disposed in segments in a winding length direction of the wire-winding part, and a length of the slot is less than a length of the wire-winding part.

3. The coil according to claim 1, wherein a width of at least one turn of winding of the wire-winding part is not equal to a width of other windings.

4. The coil according to claim 1, wherein a width of the wire-winding part increases as a winding radius increases, and wherein a width of an inner ring of the wire-winding part is less than a width of an outer ring of the wire-winding part.

5. The coil according to claim 1, wherein when the slot cuts through the wire-winding part in any direction of a cross section of the wire-winding part, the slot enables at least a part of the wire-winding part to form at least two conductive paths that are connected in parallel, and a parallel connection point of the at least two conductive paths that are connected in parallel is disposed on an uncut part of the wire-winding part, or is disposed on the input terminal and the output terminal, or is directly disposed on a connection terminal of the external circuit.

6. The coil according to claim 1, wherein the coil is a two-layer coil, and the slot is disposed on at least one layer of the coil.

7. The coil according to claim 1, wherein
the coil is a two-layer coil, the wire-winding part of the coil comprises a first-layer wire-winding part and a second-layer wire-winding part, wherein the input terminal or the output terminal is located at a first layer of the coil or a second layer of the coil;
the output terminal comprises a first part of the output terminal and a second part of the output terminal;
one end of the first part of the output terminal is connected to an innermost-turn coil of the first-layer wire-winding part, and the first part of the output terminal and the first-layer wire-winding part are located on a same plane; and
the second part of the output terminal and the second-layer wire-winding part are located on a same plane, one end of the second part of the output terminal is used as an output end of the coil and is connected to the external circuit, and an other end of the second part of the output terminal and an other end of the first part of the output terminal are connected in series via a through hole disposed between the first-layer wire-winding part and the second-layer wire-winding part.

8. The coil according to claim 7, wherein
one end of the input terminal is connected to an outermost turn of the first-layer wire-winding part or the second-layer wire-winding part, and an other end of the input terminal is connected to the external circuit.

9. The coil according to claim 8, wherein
the first-layer wire-winding part and the second-layer wire-winding part are separately cut off at the input terminal or the output terminal, and the first-layer wire-winding part and the second-layer wire-winding part are connected in parallel via the through hole.

10. The coil according to claim 1, wherein there are one or more slots, and a projection shape of the slot on a plane of the coil comprises one or more of a strip shape, a hole shape, an arc shape, a wavy shape, and a comb shape.

11. The coil according to claim 10, wherein a projection shape of the wire-winding part on the plane of the coil is a ring shape, an elliptical ring shape, or an irregular ring shape.

12. The coil according to claim 1, wherein at least a portion of the wire winding part does not include the slot.

13. The coil according to claim 1, wherein the second portion is nearer to the output terminal than the first portion in a winding length direction of the wire-winding part.

14. The coil according to claim 1, wherein the first portion is nearer to the output terminal than the second portion in a winding length direction of the wire-winding part.

15. A wireless charging receiving apparatus of a mobile terminal, comprising:
a matching circuit;
an AC/DC conversion module;
a control unit; and
a coil comprising:
an output terminal,
an input terminal, and
a wire-winding part that is connected between the output terminal and the input terminal,
wherein a slot is disposed on at least a part of the wire-winding part, the slot is disposed between outer edges of a width of the wire winding part at the at least a portion of the wire winding at which the slot is disposed, and a depth of the slot of the wire-winding part is less than or equal to the width of the wire-winding part, to reduce an eddy current loss caused in the coil by a magnetic field, wherein the slot comprises at least two portions, wherein a first portion of the slot cuts through the wire-winding part of the coil, and wherein a second portion of the slot has a preset depth disposed on the second portion of the wire-winding part of the coil, the preset depth less than a depth of the wire-winding part,
wherein the wire-winding part is a metal conductor made through spiral winding,
wherein the input terminal and the output terminal are configured to connect the wire-winding part to an external circuit; and
wherein the matching circuit is connected between the coil and the AC/DC conversion module, and is configured to generate resonance with the coil; and
wherein the control unit is configured to control the AC/DC conversion module to convert an alternating current signal received by the coil into a direct current signal, to supply power to a load in the mobile terminal.

16. The wireless charging receiving apparatus of the mobile terminal according to claim 15, wherein
the wireless charging receiving apparatus of the mobile terminal further comprises a magnetic conductive sheet, the magnetic conductive sheet is disposed on a side, away from a transmission apparatus, of a plane of the coil, and is configured to prevent leakage of a magnetic field generated by the wire-winding part, wherein the transmission apparatus is configured to charge the wireless charging receiving apparatus of the mobile terminal.

17. The wireless charging receiving apparatus of the mobile terminal according to claim 16, wherein there are two or more coils.

* * * * *